(12) United States Patent
Grip et al.

(10) Patent No.: US 10,072,684 B2
(45) Date of Patent: Sep. 11, 2018

(54) TRUSS END PAD FITTING

(71) Applicant: THE BOEING COMPANY, Chicago, IL (US)

(72) Inventors: Robert Erik Grip, Rancho Palos Verdes, CA (US); Michael Kirtland Hughes, Seattle, WA (US); Daniel Joseph Bazile, Marysville, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/849,108

(22) Filed: Dec. 20, 2017

(65) Prior Publication Data

US 2018/0163754 A1    Jun. 14, 2018

Related U.S. Application Data

(62) Division of application No. 15/404,488, filed on Jan. 12, 2017, now Pat. No. 9,863,451, which is a division of application No. 14/275,425, filed on May 12, 2014, now Pat. No. 9,568,031, which is a division of application No. 13/289,031, filed on Nov. 4, 2011, now abandoned.

(51) Int. Cl.
| | |
|---|---|
| *F16B 1/00* | (2006.01) |
| *B64C 1/26* | (2006.01) |
| *F16B 5/00* | (2006.01) |
| *F16B 5/02* | (2006.01) |

(52) U.S. Cl.
CPC ............ *F16B 1/00* (2013.01); *B64C 1/26* (2013.01); *F16B 5/0092* (2013.01); *F16B 5/02* (2013.01); *Y10T 29/49826* (2015.01); *Y10T 403/27* (2015.01)

(58) Field of Classification Search
CPC ......... Y10T 403/4602; Y10T 403/4691; Y10T 403/343; B64C 1/066; B64C 1/067
USPC ................ 403/41, 337, 408.1; 52/848, 849; 244/123.1, 124, 131
See application file for complete search history.

(56) References Cited

U.S. PATENT DOCUMENTS

| | | | |
|---|---|---|---|
| 1,645,421 | A | 10/1927 | Gloekler |
| 1,957,933 | A | 5/1934 | Brandl |
| 2,485,172 | A | 10/1949 | Shelton et al. |
| 2,856,646 | A | 10/1958 | Latimer et al. |

(Continued)

FOREIGN PATENT DOCUMENTS

| | | |
|---|---|---|
| CN | 1648470 A | 8/2005 |
| CN | 101522520 A | 9/2009 |

(Continued)

OTHER PUBLICATIONS

The International Bureau of WIPO, International Application No. PCT/US2012/057659 International Preliminary Report on Patentability dated May 6, 2014, pp. 1-8.

(Continued)

*Primary Examiner* — Joshua T Kennedy
(74) *Attorney, Agent, or Firm* — Charles L. Moore; Moore & Van Allen PLLC

(57) ABSTRACT

A mechanical fitting for connecting structures may include a base structure and a plate member. The mechanical fitting may also include a support structure for supporting the plate member at a predetermined spacing from the base structure. The support structure may include a truss structure.

20 Claims, 20 Drawing Sheets

(56) References Cited

U.S. PATENT DOCUMENTS

| | | | |
|---|---|---|---|
| D224,083 S | 7/1972 | Gilb | |
| 3,939,920 A | 2/1976 | Hardiman | |
| 3,969,810 A | 7/1976 | Pagano et al. | |
| 4,000,782 A | 1/1977 | Finkelston | |
| 4,008,772 A | 2/1977 | Boys | |
| 4,008,773 A | 2/1977 | Wallace | |
| 4,016,938 A | 4/1977 | Rice | |
| 4,074,947 A | 2/1978 | Matake et al. | |
| 4,185,504 A | 1/1980 | Exner et al. | |
| 4,192,118 A | 3/1980 | Gilb | |
| 4,294,110 A | 10/1981 | Whitehouse | |
| 4,333,220 A | 6/1982 | Aspers | |
| 4,375,120 A | 3/1983 | Sigmund | |
| 4,375,122 A | 3/1983 | Sigmund | |
| 4,375,123 A | 3/1983 | Ney | |
| 4,530,143 A | 7/1985 | Casarcia | |
| 4,597,150 A | 7/1986 | Fister et al. | |
| 4,614,077 A | 9/1986 | Muto et al. | |
| 5,105,519 A | 4/1992 | Doniwa | |
| 5,131,130 A | 7/1992 | Eshghy | |
| 5,139,361 A | 8/1992 | Camuffo | |
| 5,222,694 A * | 6/1993 | Smoot | B64C 1/066 244/119 |
| 5,249,404 A | 10/1993 | Leek et al. | |
| 5,339,696 A | 8/1994 | Carignan | |
| 5,571,971 A | 11/1996 | Chastel et al. | |
| 5,945,665 A | 8/1999 | Hay | |
| 5,979,130 A | 11/1999 | Gregg et al. | |
| 6,047,455 A | 4/2000 | Hansson | |
| 6,059,482 A | 5/2000 | Beauvoir | |
| 6,112,495 A | 9/2000 | Gregg et al. | |
| 6,158,188 A | 12/2000 | Shahnazarian | |
| 6,204,771 B1 | 3/2001 | Ceney | |
| 6,625,945 B2 | 9/2003 | Commins | |
| 6,857,808 B1 | 2/2005 | Sugimoto et al. | |
| 6,920,724 B1 | 7/2005 | Hundley | |
| 7,195,418 B2 | 3/2007 | Durand et al. | |
| 7,213,378 B2 | 5/2007 | Randez Perez et al. | |
| 7,260,997 B2 | 8/2007 | Luethje et al. | |
| 7,707,785 B2 | 5/2010 | Lin | |
| 7,856,787 B2 * | 12/2010 | Fujihashi | E04B 1/2403 52/223.14 |
| 7,909,290 B2 | 3/2011 | Cooper | |
| 7,997,534 B2 | 8/2011 | Eberth | |
| 8,016,236 B2 | 9/2011 | Grieve et al. | |
| 8,070,100 B2 | 12/2011 | Douglas | |
| 8,082,647 B2 | 12/2011 | Patton | |
| 8,128,032 B2 | 3/2012 | Pajard | |
| 8,267,354 B2 | 9/2012 | Kallinen et al. | |
| 8,433,160 B2 | 4/2013 | Shah et al. | |
| 8,769,887 B2 | 7/2014 | Proffitt, Jr. | |
| 8,910,526 B2 | 12/2014 | Carlsson et al. | |
| 9,016,991 B2 | 4/2015 | Twerdochlib et al. | |
| 2002/0148299 A1 | 10/2002 | Leong | |
| 2009/0070978 A1 | 3/2009 | Patton | |
| 2010/0243810 A1 | 9/2010 | Lobo Barros et al. | |
| 2010/0329602 A1 | 12/2010 | Shah et al. | |
| 2013/0114994 A1 | 5/2013 | Grip et al. | |
| 2014/0255082 A1 | 9/2014 | Grip et al. | |

FOREIGN PATENT DOCUMENTS

| | | |
|---|---|---|
| EP | 1619116 A1 | 1/2006 |
| FR | 2676032 A1 | 11/1992 |
| GB | 1184757 A | 3/1970 |
| JP | H10-266349 A | 10/1998 |
| WO | 2008099097 A2 | 8/2008 |
| WO | 2012057659 A1 | 5/2012 |
| WO | 2012057659 A8 | 9/2012 |

OTHER PUBLICATIONS

Japanese Patent Office; Office Action for Japanese Patent Application No. 2014-539958 dated Jun. 28, 2016, 3 Pages.

Chinese Patent Office; Office Action for Chinese Patent Application No. 201280054037.1 dated Aug. 22, 2016, 14 Pages.

European Patent Office; International Search Report and Written Opinion for International Application No. PCT/US2012/057659 dated Feb. 22, 2013, 11 Pages.

Chinese Patent Office; Office Action for Chinese Patent Application No. 201280054037.1 dated Jun. 10, 2015, 10 Pages.

Chinese Patent Office; Office Action for Chinese Patent Application No. 201280054037.1 dated Mar. 1, 2016, 17 Pages.

Japanese Patent Office; Office Action for Japanese Patent Application No. 2014-539958 dated Feb. 14, 2017, 5 Pages.

The International Bureau of WIPO, International Search Report and Written Opinion for International Application No. PCT/US20121057659 dated Feb. 22, 2013, 11 Pages.

* cited by examiner

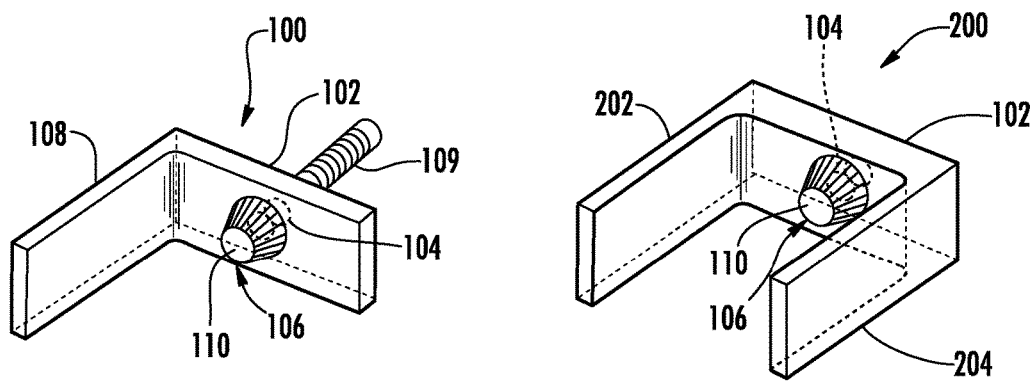
FIG. 1
(PRIOR ART)
FIG. 2A
(PRIOR ART)
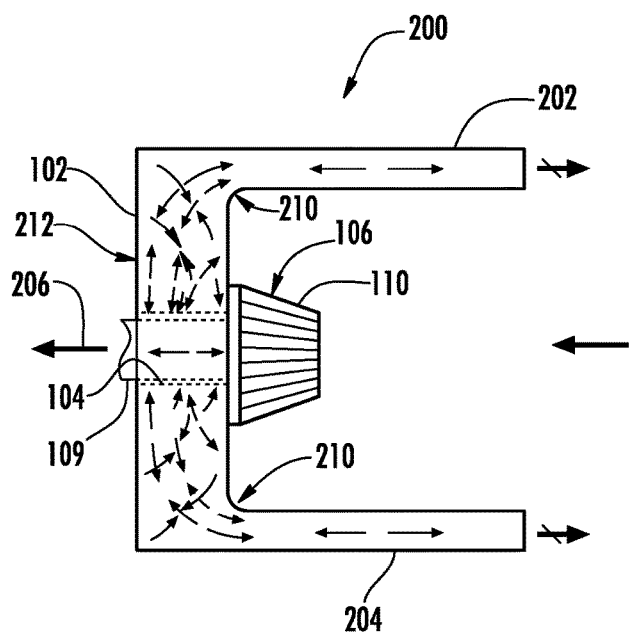
FIG. 2B
(PRIOR ART)

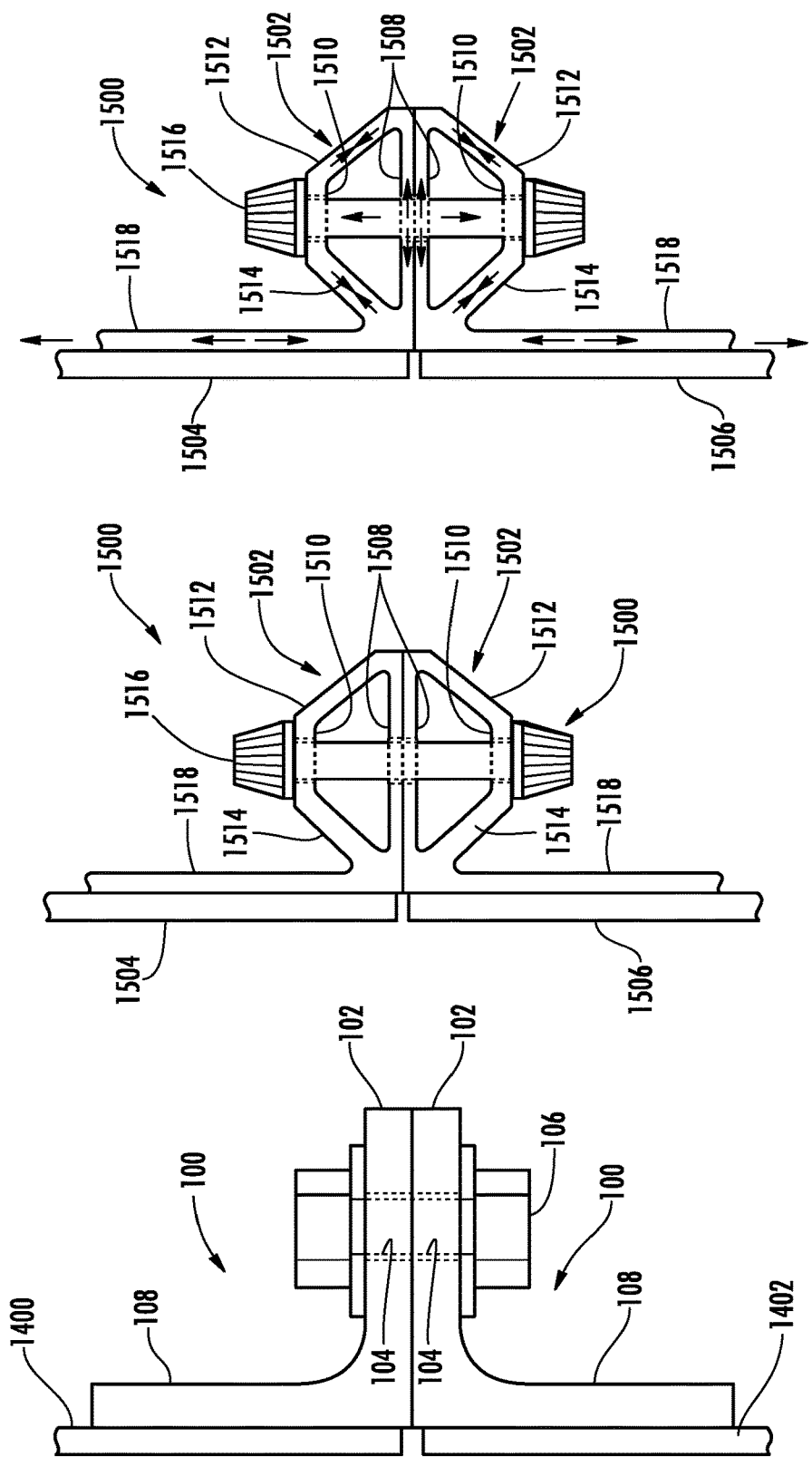

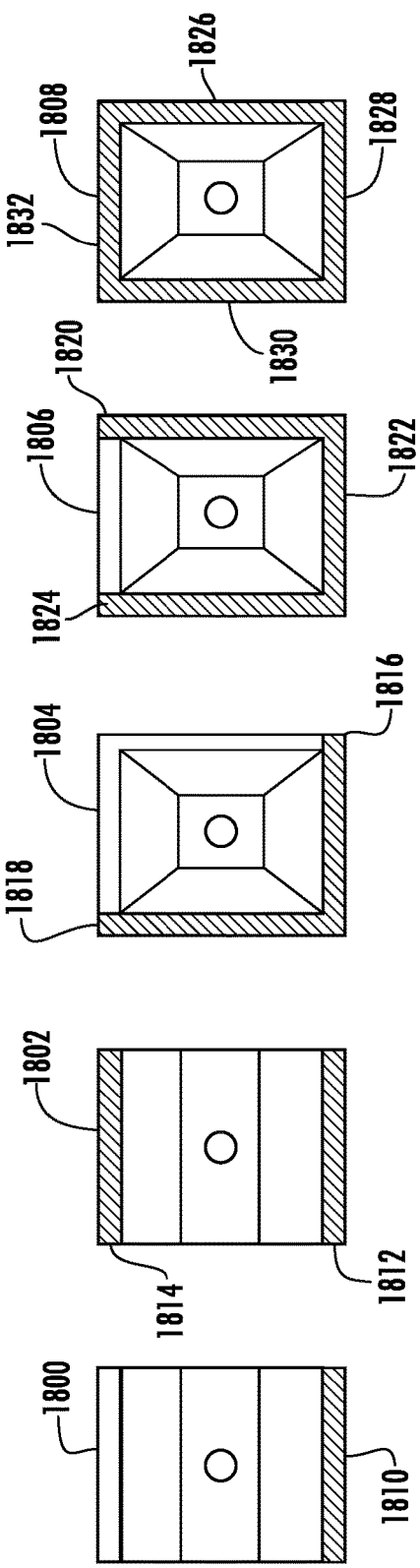
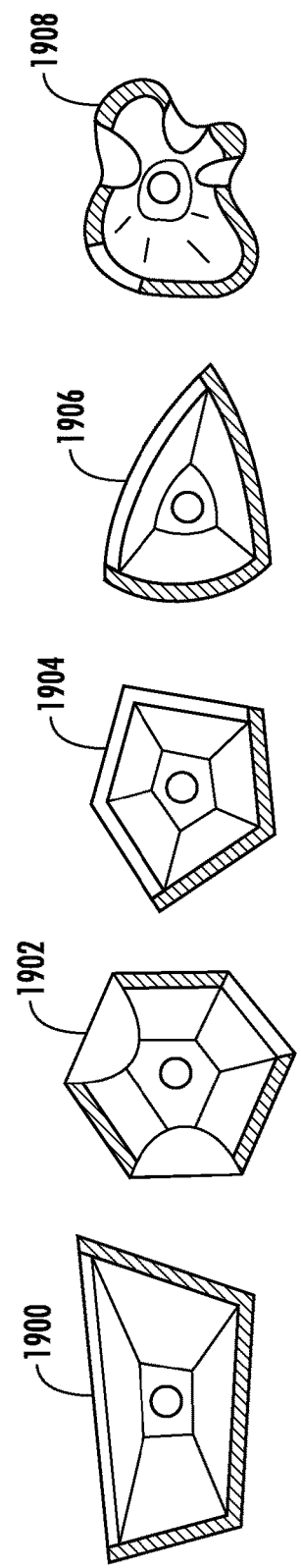

TRUSS END PAD FITTING

CROSS-REFERENCE TO RELATED APPLICATIONS

This application is a divisional application of application Ser. No. 15/404,488, filed Jan. 12, 2017 which is a divisional of application Ser. No. 14/275,425, filed May 12, 2014 which is a divisional application of application Ser. No. 13/289,031, filed Nov. 4, 2011.

FIELD

The present disclosure relates to aircraft, aerospace vehicles, other vehicles and other structures, and more particularly to truss end pad fittings that connect two structures and transfer axial loads between them with a minimum of bending and shear stresses in the fittings.

BACKGROUND

Structures, such as aircraft, civil structures and other large structures, may be built from assemblies, which in turn may be built from subassemblies. In such structures transmitting large loads between one assembly and an adjacent assembly or subassembly is often necessary. For example, one semi-span of an aircraft wing may be attached to a structure on the fuselage. As the wing bends upward due to upward air loads acting upon the wing, compression stress is caused in the upper wing surface and tension loads are created in the lower wing surface. At the root of the wing where the wing attaches to the aircraft fuselage or another semi-span depending on the wing design, transferring the large compression or tension loads from one structure to another may be necessary. Transferring tension loads are more challenging than compression loads for reasons described herein. Structural details or mechanical devices that are often used to transmit these loads are typically referred to as tension clips or tension fittings. Examples of different types of such fittings are illustrated in FIGS. 1-4. The dimensions of the various components of such fittings may vary widely. The different types of fittings may include similar components as described herein. FIG. 1 is a perspective view of an example of a prior art angle clip 100 useable in connecting structures. The angle clip 100 may include an end pad 102. The end pad 102 may include an opening 104 formed therein for receiving a fastener 106, such as a bolt or other type fastener. The fastener 106 may include a shank 109 and a head 110. Opening 104 is sized to prevent the head 110 of the fastener 106 from passing through the opening 104. The end pad 102 may be a plate that carries the fastener load to any adjoining walls by shear and bending forces or loads similar to those illustrated in FIG. 2B. Typically, the end pad 102 is substantially quadrilateral in shape, for example substantially rectangular.

The fastener 106 or bolt may connect the angle clip 100 or other fitting to a mating fitting on an adjacent structure. The angle clip 100 or other fitting may abut a mating fitting on the adjacent structure. An example of a fitting abutting a mating fitting that is attached to an adjacent structure is illustrated in FIG. 14.

All tension clips and fittings described herein have certain features in common related to how they transmit tension loads between two structures: Tension loads are transmitted to a fitting from one structure through the fitting's walls attached (or integral) to that structure and these loads are transmitted to another structure via a tension fastener (or fastners). FIG. 2B illustrates tension forces acting on the side walls and tension fastener shank 109 of a channel tension clip. Thus, for a pair of mating fittings, highly loaded such that the end pads bend and the side walls between the two adjoining fittings separate from each other, the load path can be described as follows: tension load travels from a structure into the side walls of one fitting to the end pad of that fitting, through the tension bolt into the end pad of the adjoining fitting, and then to the side walls of the that adjoining fitting, and then to the adjoining structure.

The angle clip 100 may include an adjoining wall or side wall 108 that may project substantially perpendicular to the end pad 102 and substantially parallel to an axis of the fastener 106 or bolt. A fitting including three of the four sides of a quadrilateral end pad 102 having adjoining side walls is referred to as a channel fitting. An example of a channel fitting 400 including three adjoining side walls 402, 404 and 406 is illustrated in FIG. 4. The side wall 406 of a channel fitting is also referred to as a back plane. If only two sides that meet in a common corner are joined to the end pad 102, the fitting is termed an angle fitting. An example of an angle fitting 300 including two adjacent joining side walls 302 and 304 is illustrated in FIG. 3. If only one of the sides of the quadrilateral is joined to a side wall, the fitting is termed an angle clip 100 as illustrated in FIG. 1. If two opposite sides of the quadrilateral end pad 102 are each joined to a side wall 202 and 204, the fitting is termed a channel tension clip. An example of a channel tension clip 200 is illustrated in FIG. 2A with the two opposite side walls 202 and 204.

On a weight efficiency basis, channel tension fittings are more efficient than channel fittings, which in turn are more efficient than angle fittings, which in turn, are more efficient than channel or angle clips. While machining cost does influence the design of channel fittings and channel tension clips, minimizing weight of any structural components of an aircraft or structure to be used in outer space is highly desirable. This is because, over the life of the structure, each unit of weight for each part of the vehicle represents a very large amount of fuel with an associated cost. Since the weight savings allows the total vehicle weight to be reduced, there may also be other benefits or advantages, such as for example manufacturing and maintenance costs. The design of the fittings described with reference to FIGS. 1-4 results in a part with a certain weight, depending on such parameters as the axial load, the location of the fastener or bolt with respect to the adjoining walls, and the material properties of the fitting. Accordingly, there is a need for fittings and other components which can reduce weight of a part or assembly without sacrificing structural integrity or incurring a prohibitive manufacturing or maintenance cost.

Additionally, the axial load, as illustrated by arrow 206 in FIG. 2B, from the fastener 106 or bolt is also transferred into the end pad 102 as illustrated in FIG. 2B primarily by the mechanism of the fastener head 110 clamping the end pad 102. From there, the load is transmitted to the side walls 202 and 204 by combined shear and bending forces. In other words, the end pad 102 behaves similar to a beam. Since transferring loads from one point to another point by bending is not as efficient as transferring loads by axial force, there is an inherent inefficiency in using plates in bending to transfer the load.

The use of a bolt forces a certain amount of eccentricity into the connection. Because the bolt has a head which is typically 1.6 times the diameter of the bolt shank, the side walls cannot be any closer than 0.8 times the diameter of the bolt from the axis of the bolt. However, the fittings also need to be constructed with generous fillet radii at the junction of the end pad 102 and side walls 108, 202, 204, 302, 304, 402, 404 and 406 to preclude cracking, further increasing the eccentricity. In addition, unless an internal socket head is used, it is necessary for a socket wrench to fit over the head of the bolt. This minimum eccentricity forces the end pad to be a certain minimum size. For beams, increased length results in increased stresses, which result in inefficiency.

Tension bolts in traditional tension fittings and clips are often sized to have large diameters, in order to increase fitting end pad bending strength. Larger bolt heads increase fitting strength by reducing moments induced in the end pad (specifically by reducing the effective end pad "lever arm" length, the span between the edge of the bolt and the fitting walls). However, this approach to increasing fitting strength results in a weight penalty. The large heavy bolts used frequently end up having greater tension capacity than the fitting itself, which results in structural inefficiency.

The geometry of the fittings and the path of the load through the end pad 102 into the sidewalls require that the locations of high stress due to bending pass through the corners where the side walls 202 and 204 are joined to the end pad 102. This area of the structure has a high stress concentration coefficient for loading as illustrated in FIG. 2B. Thus, even though a generous fillet radius is provided, fittings are susceptible to fatigue cracking at these locations.

Since fittings are often made out of plate or extrusion, there is always a fillet 210, such as fillet 210 in FIG. 2B for which the direction of maximum stress is oriented in the short transverse material direction of the plate 212 as illustrated in FIG. 2B. This material direction is usually the weakest and most brittle direction. Since it is unavoidable to load at least one fillet in this direction, it is necessary to select metallic alloys that are not as brittle. However, the price for this additional ductility is a reduction in ultimate strength. This reduction in allowable stresses results in increased inefficiency of the fitting.

A bolt is comprised of a shank and a head. The shank portion has a threaded portion which accepts the nut that is screwed onto the bolt, and an unthreaded portion. Under axial tension load, the location of maximum stress occurs at the net area under the first thread. Thus, the material of the bolt in the unthreaded area is not loaded to the ultimate capacity of the material because it is limited by the net area under the threads. In addition, the threads introduce a stress concentration due to the notch created by the thread. Thus, a threaded bolt itself has an inherent inefficiency. This inefficiency forces the diameter of the bolt to be larger than it would have been if these effects were not present, which in turn, forces the end pad to be wider than it otherwise would need to be. Thus the inefficiencies in the bolt have a compounding effect on the rest of the fitting. This compounding effect works in the reverse direction also. Increased eccentricities in the joint result in bending forces being applied to the bolt. For the bolt to carry these bending moments, the bolt diameter needs to be increased to sustain them. The increased bolt size therefore results in even greater eccentricity, which compounds itself.

A fitting is machined, forged, or extruded from a single material. Certain parts of the fitting are loaded in tension, while others are loaded in compression or shear. The materials used for current fittings are selected to handle these different loads in different parts of the fitting. This can result in inefficiencies, such as extra weight of the fitting and costs. Accordingly, fittings are needed that take into consideration the different loads carried by different portions of the fittings to be able to more efficiently carry the tension and compression loads and at the same time provide reduced weight and cost.

SUMMARY

In accordance with an embodiment, a mechanical fitting for connecting structures may include a first plate, end plate or base structure and a second plate or plate member. The mechanical fitting may also include a support structure for supporting the plate member at a predetermined spacing from the end plate or base structure.

In accordance with another embodiment, a mechanical fitting for connecting structures may include a first plate, end plate or base structure and a second plate or plate member. The mechanical fitting may also include at least one side wall extending from the end plate or base structure for attachment to a structure. The mechanical fitting may additionally include a first sloping plate extending between the plate member and a vertex formed by the at least one side wall and the base structure. The first sloping plate may extend from the base structure at a first predetermined angle relative to a plane of the base structure. The mechanical fitting may further include a second sloping plate extending between the plate member and the base structure. The second sloping plate may extend from the base structure at a second predetermined angle relative to the plane of the end plate.

In accordance with another embodiment, a method for connecting structures may include receiving one end of a fastener through an opening in a base structure of a mechanical fitting to fasten the fastener to a mating mechanical fitting. The method may also include retaining an opposite end the fastener by a plate member of the mechanical fitting. The opposite end of the fastener is adapted to be held by the plate member. The method may additionally include extending a first sloping plate between the plate member and the base structure. The first sloping plate may extend from the base structure at a first predetermined angle relative to a plane of the base structure. The method may further include extending a second sloping plate between the plate member and the base structure. The second sloping plate may extend from the base structure at a second predetermined angle relative to the plane of the base structure.

Other aspects and features of the present disclosure, as defined solely by the claims, will become apparent to those ordinarily skilled in the art upon review of the following non-limited detailed description of the disclosure in conjunction with the accompanying figures.

BRIEF DESCRIPTION OF THE SEVERAL VIEWS OF THE DRAWINGS

The following detailed description of embodiments refers to the accompanying drawings, which illustrate specific embodiments of the disclosure. Other embodiments having different structures and operations do not depart from the scope of the present disclosure.

FIG. 1 is a perspective view of an example of a prior art angle clip useable in connecting structures.

FIG. 2A is a perspective view of an example of a prior art channel tension clip useable in connecting structures.

FIG. 2B is a top view of the prior art channel tension clip in FIG. 2A illustrating forces or loads on the channel tension clip and internal tension and compression stresses within the clip.

FIG. 14 is top view of a pair of prior art angle tension clips fastened together for connecting two structures.

FIG. 15A is a top view of a pair of truss angle tension clips including a truss end pad support structure for joining two structures in accordance with an embodiment of the present disclosure.

FIG. 15B is a top view of the pair of truss angle tension clips of FIG. 15A illustrating forces or loads on the tension clip and truss end pad fitting, and internal tension and compression stresses within the fitting.

FIGS. 18A-18E are each a top view of different fittings including a rectangular polygon truss end pad fitting in accordance with an embodiment of the present disclosure.

FIGS. 19A-19E are each a top view of different fittings including an irregularly shaped truss end pad fitting in accordance with an embodiment of the present disclosure.

DESCRIPTION

Figure 3:
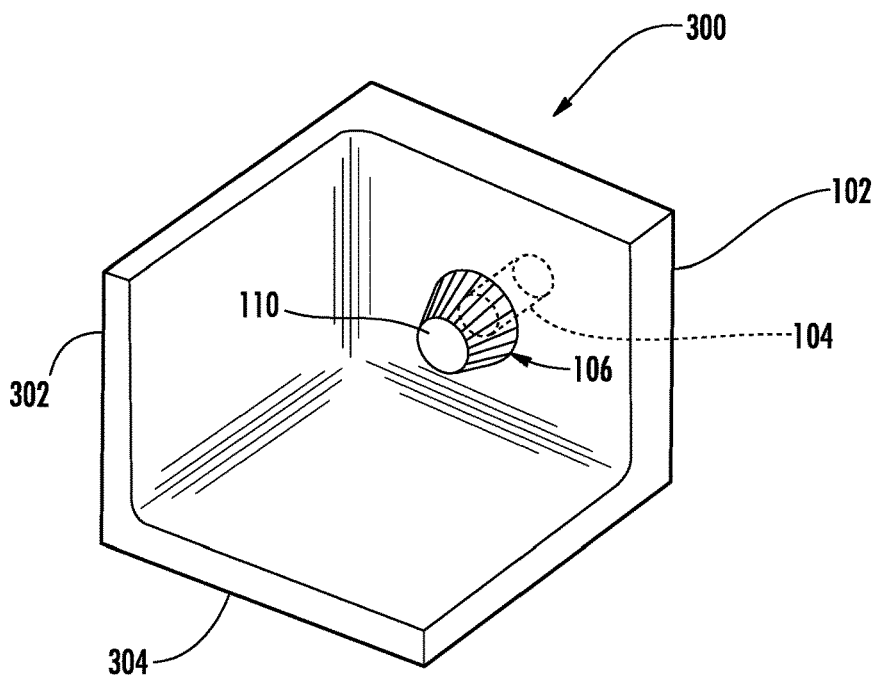
FIG. 3 is a perspective view of an example of a prior art angle fitting for use in connecting structures.
Figure 4:
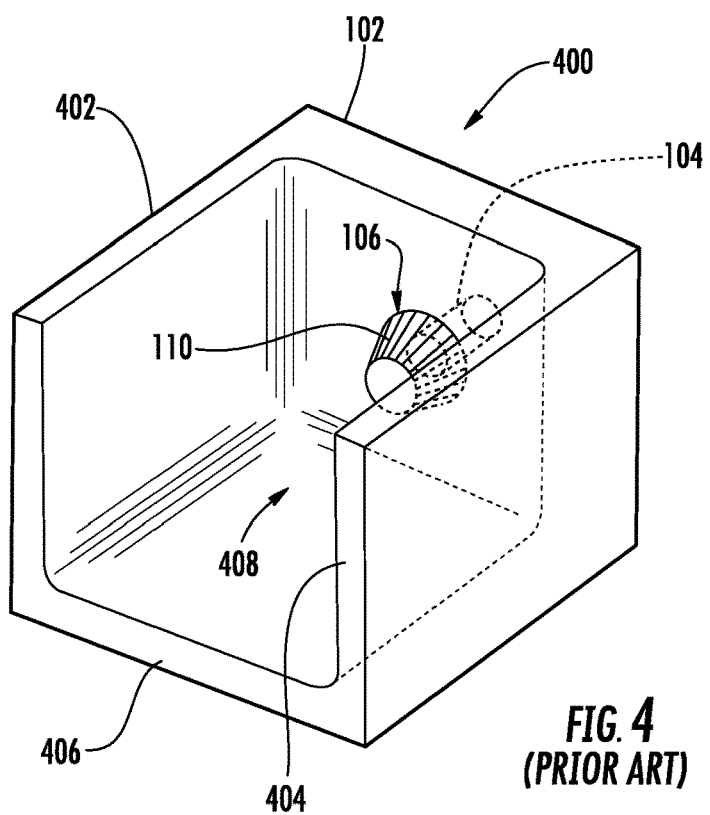
FIG. 4 is a perspective view of an example of a prior art channel fitting for use in connecting structures.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Figure 5A:
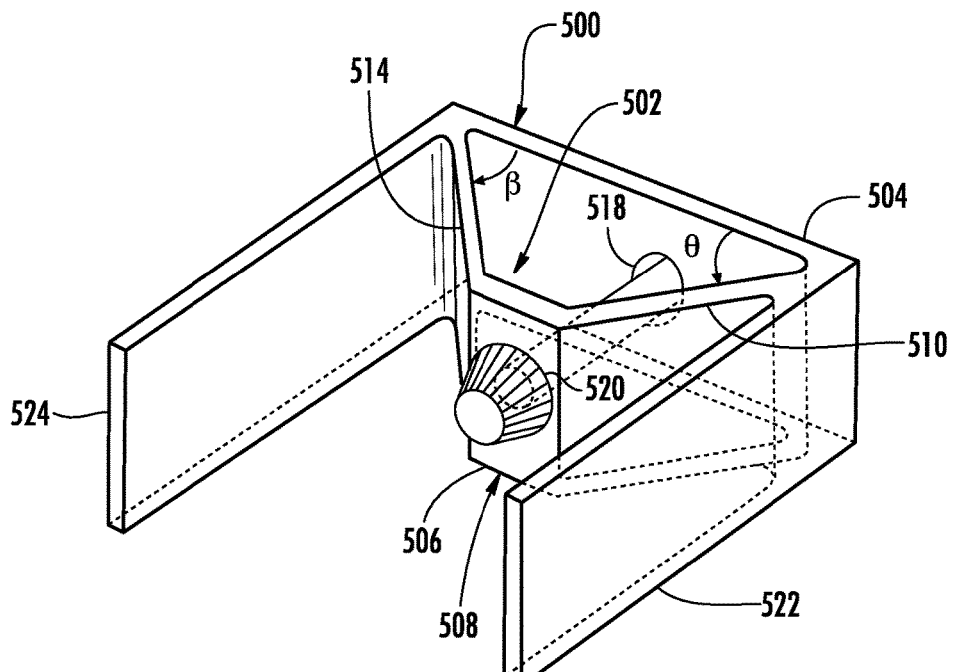
FIG. 5A is a perspective view of an example of a mechanical fitting for connecting structures including an end pad support structure in accordance with an embodiment of the present disclosure.

FIG. 5A is a perspective view of an example of a mechanical fitting 500 useable for connecting structures including an end pad support structure 502 in accordance with an embodiment of the present disclosure. The exemplary mechanical fitting 500 in FIG. 5A is a truss channel tension clip type mechanical fitting. The support structure or end pad support structure 502 will be initially described with reference to the truss channel tension clip type mechanical fitting; although, the end pad support structure 502 or variations thereof may be used in association with other types of fittings as described herein or as will be understood by those skilled in the art. The mechanical fitting 500 may include a first plate, end plate or base structure 504 and second plate or plate member 506. The end pad support structure 502 or end pad support structure supports the second plate or plate member 506 at a predetermined spacing from the base structure 504. The base structure 504 and the plate member 506 may be substantially parallel to one another but do not necessarily have to be. For example, the plate member 506 may be oriented at a predetermined angle relative to a plane of the base structure 504.

The end pad support structure 502 may include a truss support structure 508 or similar structure. The truss support structure 508 may include a first sloping plate 510 extending between the plate member 506 and the base structure 504. The first sloping plate 510 extends from the base structure 504 at a first predetermined angle θ relative to a plane of the base structure 504 illustrated by line 512 in FIG. 5B.

The truss support structure 508 also includes a second sloping plate 514 extending between the plate member 506 and the base structure 504. The second sloping plate 514 may extend from the base structure 504 at a second predetermined angle $\vartheta$ relative to the plane 512 of the base structure 504. The first predetermined angle $\theta$ and the second predetermined angle $\vartheta$ may be equal to one another or in other embodiments may be different angles similar to that illustrated in FIG. 9.

The mechanical fitting 500 may also include a fastener 516. The fastener 516 may be a bolt or other type of fastener similar to that described herein. A hole or opening 518 may be formed in the base structure 504 for receiving the fastener 516. Another hole or opening 520 may be formed in the plate member 506 for receiving the fastener 516. The fastener 516 may be adapted to attach the mechanical fitting 500 to a mating mechanical fitting similar to that illustrated in FIGS. 6, 15A and 17A.

Figure 5B:
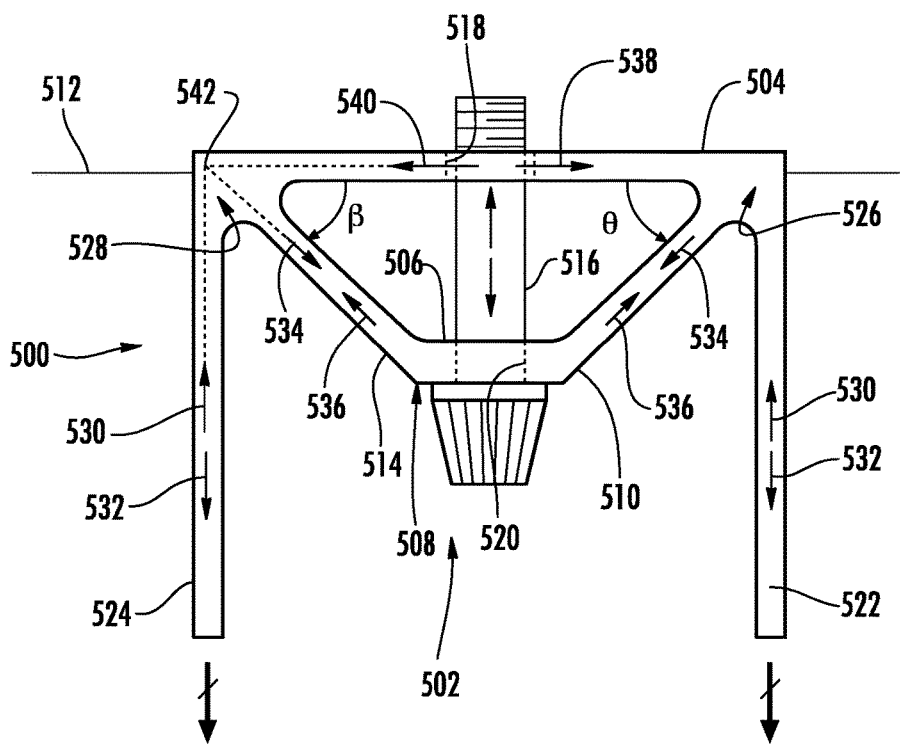
FIG. 5B is a top view of the truss channel tension clip including the truss end pad fitting of FIG. 5A illustrating forces or loads on the tension clip and truss end pad fitting and internal tension and compression stresses within the fitting.

The mechanical fitting 500 may include at least one side wall extending from the base structure 504. In this configuration the mechanical fitting 500 would represent an angle clip truss fitting similar to each of the mating angle clip truss fittings illustrated in FIGS. 15A and 15B. The mechanical fitting 500 or truss channel tension clip as illustrated in FIGS. 5A and 5B includes a first side wall 522 and a second side wall 524. The side walls 522 and 524 may extend from opposite ends of the base structure 504 on either side of the end pad support structure 502 or truss support structure 508. The first sloping plate 510 may extend between the plate member 506 and a vertex 526 formed by the base structure 504 and the first side wall 522. The second sloping plate 514 may extend between the plate member 506 and a vertex 528 formed by the base structure 504 and the second side wall 524. Because the truss support structure 508 resolves the system of forces by internal tension and compression loads and minimizes bending moments in the members 504, 510, and 514, there will be less moments transferred into the side walls 522 and 524. For this reason, the side walls 522 and 524 may be thinner compared to traditional mechanical fittings, such as those illustrated in FIGS. 1-4.

In accordance with different embodiments, the truss support structure 508 may replace the end pad in traditional tension fittings, such as those illustrated in FIGS. 1-4 and any variations thereof or types of mechanical fittings in addition to those illustrated and described herein.

FIG. 5B is a top view of the mechanical fitting 500 including the truss support structure 508 of FIG. 5A illustrating forces or loads on the mechanical fitting 500 and truss support structure 508 and internal tension and compression stresses within the mechanical fitting 500. The sloping plates 510 and 514 transmit the fastener or bolt tension load to the side walls 522 and 524 via load components acting parallel to the fastener 516 or tension bolt. Because of the slope, these sloping plates 510 and 514 also transmit a horizontal component of load into the vertices 526 and 528. The load components in the side walls 522 and 524 are tension load components as illustrated by arrows 530 and 532 in FIG. 5B. The sloping plates 510 and 514 carry only compression loads as illustrated by arrows 534 and 536 in FIG. 5B. The end plate or base structure 504 carries the horizontal load components acting substantially perpendicular to the fastener 516 transmitted by the sloping plates 510 and 514. The base structure 504 carries only tension loads as illustrated by arrows 538 and 540 in FIG. 5B.

Applying tension to the fastener 102 or bolt in the prior art end plate mechanical fittings in FIGS. 1-4, respectively, places the end plate 102 of the fitting in compression when the end plate 102 is abutted against the end plate 102 of a mating fitting similar to that illustrated in FIG. 14. In the mechanical fitting 500, the bolt or fastener tension is acted on by the sloping members 510 and 514 in axial compression as illustrated in FIG. 5B and previously described. The sloping plates 510 and 514 may also be referred to as compression members or pyramid sides. The proportions and dimensions of the mechanical fitting 500 in the vicinity of the fastener 516 are formed such that the bolt tension will not apply significant bending moments into the sloping plates 510 and 514 or compression members of the truss structure 508.

The forces in the sloping plates 510 and 514 or compressive members are reacted by the base structure 504 and the side wall at each side wall 522 and 524. A vertical component of the force in the sloping plates 510 and 514 is carried solely by the side walls 522 and 524. The horizontal component of the force in the sloping plates 510 and 514 is carried by the base structure 504.

In the exemplary embodiment illustrated in FIGS. 5A and 5B, the fastener 516 is mid-way between the two side walls 522 and 524. Each side wall 522 and 524 will carry substantially one-half of the tension force in the fastener 516. The magnitude of the load carried by the base structure 504 will vary depending on the angles $\theta$ and $\vartheta$ between each sloping plate 510 and 514 and the base structure 504. A large angle $\theta$ or $\vartheta$ will result in less force being carried by the base structure 504. A smaller angle $\theta$ or $\vartheta$ will result in more force being carried by the base structure 504.

The geometry of the intersection of the sloping plates 510 and 514, base structure 504, and side walls 522 and 524 may be formed so that the mid-surfaces of each member meet in a common intersection point. As illustrated in FIG. 5B, broken lines are shown extending down the mid-surfaces of sloping plate 514, base structure 504 and side wall 524 which meet at a common point 542. This arrangement minimizes bending moments in the compressive sloping plates 510 and 514, base structure 504, and side walls 522 and 524 resulting from eccentricities that would occur if the locations of the forces were not lined up in this manner.

Figure 6:
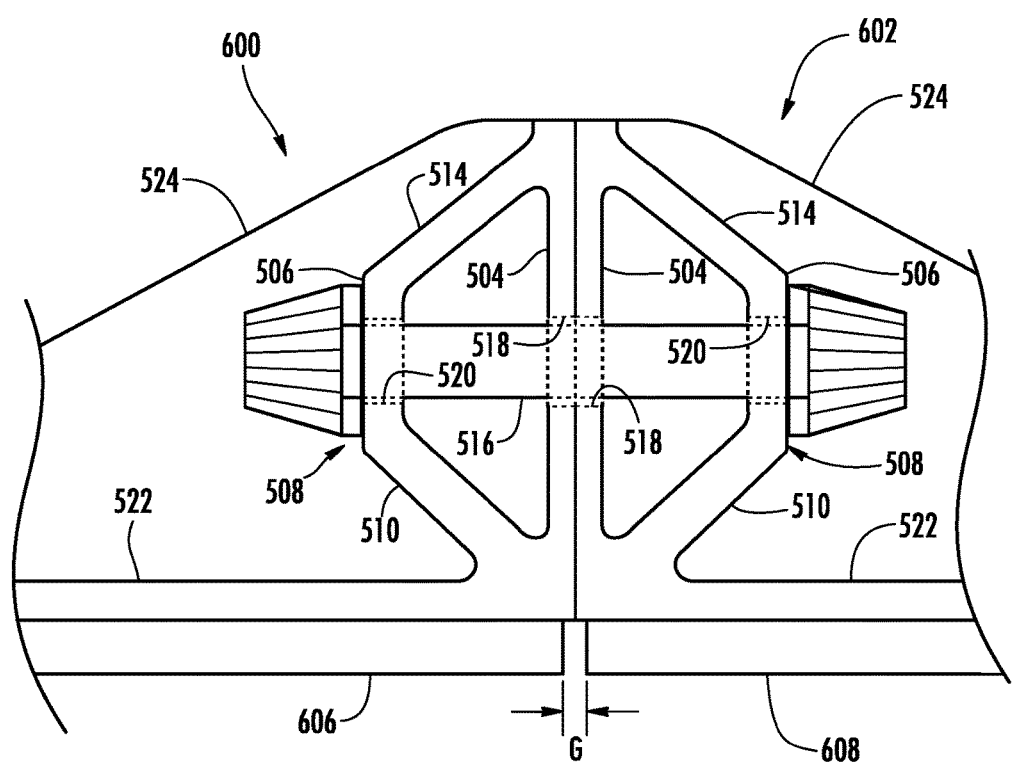
FIG. 6 is a top view of a truss end pad mechanical fitting and a mating truss end pad mechanical fitting connecting structures in accordance with an embodiment of the present disclosure.

FIG. 6 is a top view of an example of a truss end pad mechanical fitting 600 and a mating truss end pad mechanical fitting 602 connecting structures 606 and 608 in accordance with an embodiment of the present disclosure. The exemplary truss end pad mechanical fittings 600 and 602 illustrated in FIG. 6 are each similar to the truss channel tension clip type mechanical fitting 500 including a truss support structure 508 similar to that described with reference to FIGS. 5A and 5B. The truss end pad mechanical fittings 600 and 602 may butt against one another as illustrated in FIG. 6. The fastener 516 or tension bolt connects the two fittings 600 and 602 together. The side walls 522 and 524 may also support structures. In the example illustrated in FIG. 6 side wall 522 of truss end pad fitting 602 supports structure 606 and side wall 522 of truss end pad fitting 602 supports structure 608. The structures 606 and 608 may be attached to the side wall 522 by fasteners or by another suitable attachment mechanism. The structures 606 and 608 may be structures, assemblies or subassemblies of an aircraft or structure, such as a bridge, building or other civil structure. There may be a gap G between structures 606 and 608.

Figure 7:
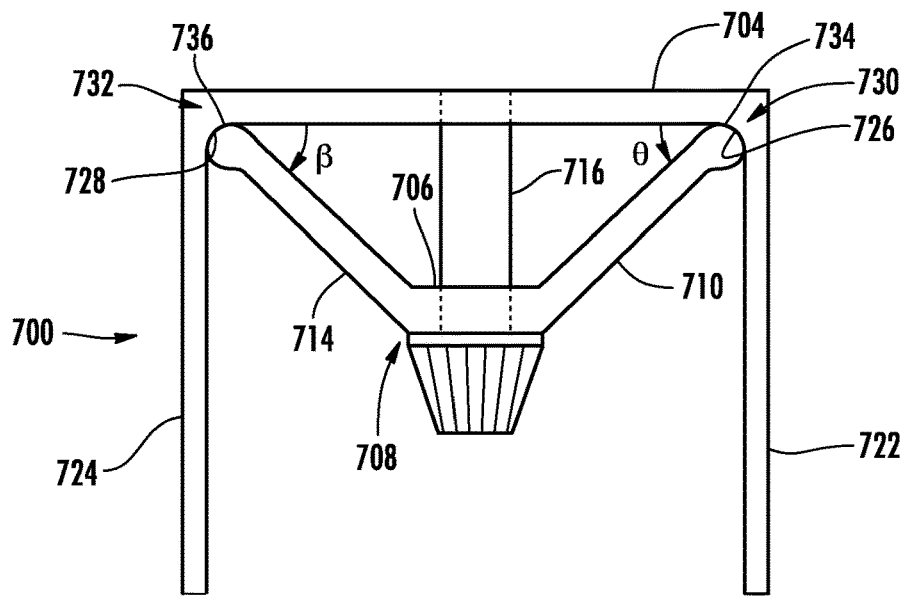
FIG. 7 is a top view of an example of a truss channel tension clip including a truss end pad fitting in accordance with another embodiment of the present disclosure.

The truss end pad mechanical fitting 600 may be made from a single piece of material similar to the exemplary mechanical fitting 500 described with reference shown in FIGS. 5A and 5B or the fitting may be formed from different components. FIG. 7 is a top view of an example of a truss end pad mechanical fitting 700 including a truss support structure 708 which is a separate component in accordance with another embodiment of the present disclosure. The truss support structure 708 may include a second plate or plate member 706 and first and second sloping plates 710 and 714 that may be integrally formed separate from the end plate or base structure 704 and side walls 722 and 724. An end of each of the sloping plates 710 and 714 may abut or contact a vertex 726 and 728 formed by base structure 704 and each of the side walls 722 and 724.

The truss support structure 708 may be made from a different material from the base structure 704 and side walls 722 and 724. Materials may be selected for the truss support structure 708 such that the first and second sloping plates 710 and 714 are formed from a material having advantageous mechanical properties in compression or mechanical properties that are more resistant to compression forces or loads between the base structure 704 and the plate member 706 compared to a material that may be selected to form the base structure 704 and side walls 722 and 724. Similarly, the material for the base structure 704 and side walls 722 and 724 may be selected to provide advantageous mechanical properties under tension loads or forces or more resistant to tension loads or forces.

Additionally, materials having different properties, such as different electrical, conductive, thermal, insulating or other advantageous properties, may be selected to form the truss support structure 708 and base structure 704 and side walls 722 and 724 depending upon the application or use of the fitting. The truss support structure 708 is also applicable to other types of mechanical fittings. The truss support structure 708 may also be referred to as a compression member. The cross sectional area of the sloping members 710 and 714 may be increased at the ends of the members where they contact the vertices 730 and 732. This additional area may reduce the bearing stresses in the members 710, 714, and in the material near the vertices 730 and 732. In addition, the increased radii of the ends of the sloping members 710 and 714 can mate to fillet radii 734 and 736, further reducing stress concentrations in the base structure 704. In addition, surface preparations including, but not limited to shot peening, lubricants, and coatings may protect the contact surfaces between the base structure 704, fillet radii 734 and 736 and truss support structure 708. Furthermore, the truss support structure 708 may be made of an electrically insulative material, which may be advantageous in certain applications.

Figure 8:
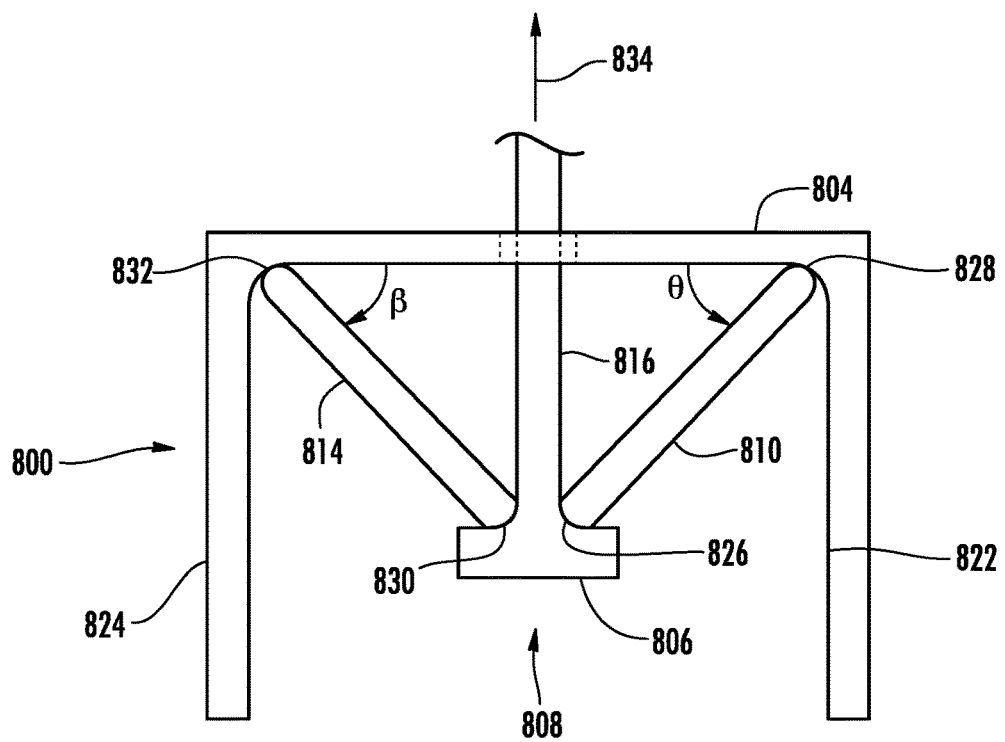
FIG. 8 is a top view of an example of a truss channel tension clip including a truss end pad fitting in accordance with a further embodiment of the present disclosure.

FIG. 8 is a top view of an example of a truss end pad mechanical fitting 800 including a truss support structure 808 in accordance with a further embodiment of the present disclosure. The truss end pad mechanical fitting 800 may be similar to the mechanical fittings 500 and 700 except the fastener 516 or bolt may be replaced by another type of tension member, such as a band 816 or other type tension member. Another difference may be the sloping plates 810 and 814 or compression members are not integrally formed with the second plate or plate member 806. One advantage of the tension member or band 816 relative to a threaded bolt is that the band 816 eliminates the threads and thus the band 816 may be more efficient. To add tension to the tension member or band 816, a force may be applied to the band 816 as illustrated by arrow 834 to induce tension into the band 816 and compression into the compression members or sloping plates 810 and 814.

The band 816 may be integrally formed with the plate member 806 as illustrated in FIG. 8 or the plate member 806 may be attached to the band 816 by some mechanism. The first sloping plate 810 may include a first end 826 abutting a vertex formed by the band 816 and the plate member 806. An opposite end 828 of the first sloping plate 810 abuts a vertex formed by a first side wall 822 and the end plate or base structure 804. The first sloping plate 810 may extend from the base structure 804 at a first predetermined angle θ relative to a plane of the base structure 804.

The second sloping plate 814 may include a first end 830 abutting a vertex formed by the band 816 and the plate member 806. An opposite end 832 of the second sloping plate 814 may abut a vertex formed by the base structure 804 and a second side wall 824 of the truss end pad mechanical fitting 800. The second sloping plate 814 may extend from the base structure 804 at a second predetermined angle ϑ relative to the plane of the base structure 804. The band 816 and first and second sloping plates 810 and 814 are also applicable to other types of mechanical fittings.

Figure 9:
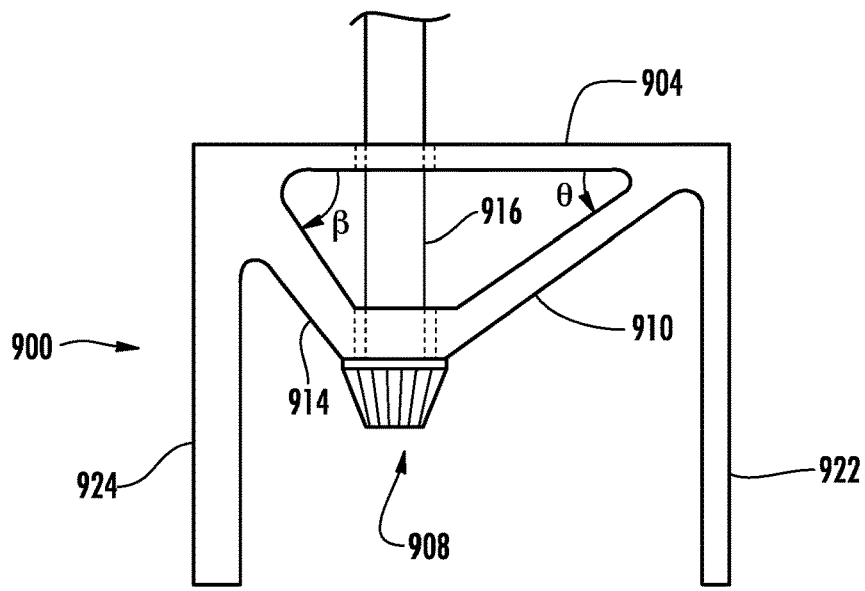
FIG. 9 is a top view of an example of a truss channel tension clip including a truss end pad fitting in accordance with yet a further embodiment of the present disclosure.

FIG. 9 is a top view of an example of a truss end pad mechanical fitting 900 including a truss support structure 908 in accordance with yet a further embodiment of the present disclosure. The truss end pad mechanical fitting 900 may be similar to the mechanical fitting 500 in FIG. 5A except the fastener 916 may be closer to one of the side walls and the truss support structure 908 may be off-center similar to that illustrated in FIG. 9. The truss end pad mechanical fitting 900 may include a side wall 924 that may be thicker in relation to the other side wall 922 in proportion to the distances of the fastener 916 from the respective side walls 922 and 924. Additionally, the angles of the sloping members 910 and 914 will be different relative to a plane of the end plate or base structure 904 and a thickness of the sloping members 910 and 914 may vary to accommodate the different compressive loads. The angles and thicknesses of the sloping members 910 and 914 may be adjusted to maintain a minimum weight of the mechanical fitting 900 and to minimize any moments resulting from eccentricities.

Figure 10:
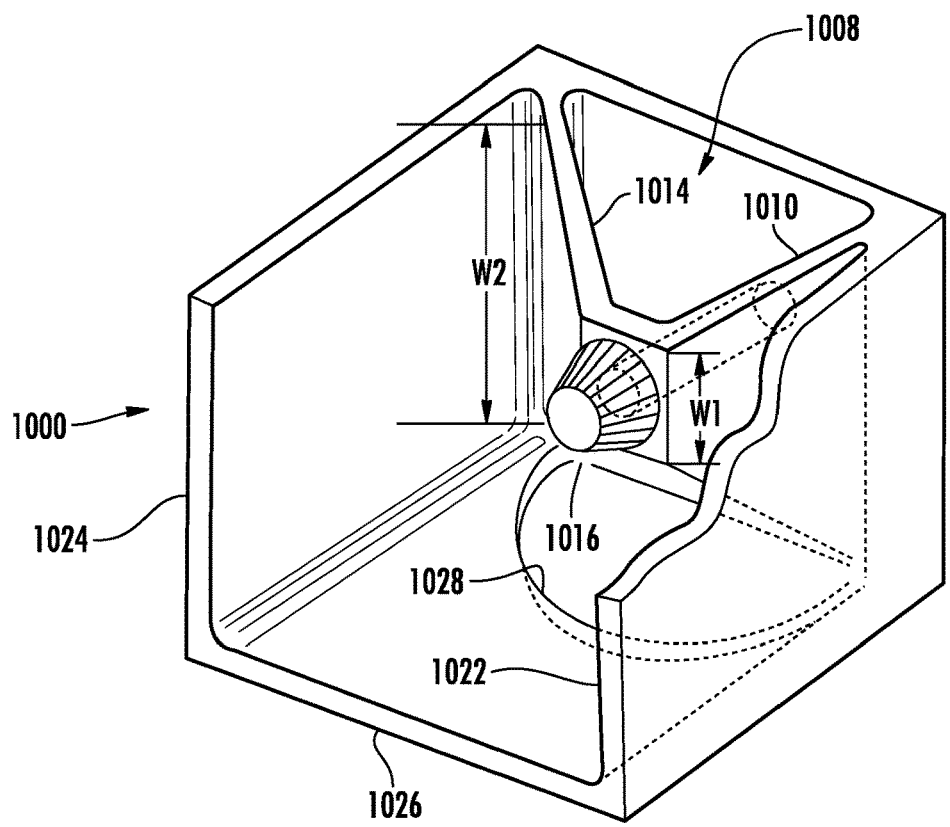
FIG. 10 is a top view of an example of a truss channel fitting including a truss end pad fitting in accordance with an embodiment of the present disclosure.

The support structures or truss support structures 508-908 described with reference to FIGS. 5-9 are also applicable to other types of fittings. FIG. 10 is a top view of an example of a truss channel fitting 1000 including a truss support structure 1008 in accordance with an embodiment of the present disclosure. The truss channel mechanical fitting 1000 includes an adjoining sidewall or backplane 1026 between side walls 1022 and 1024. Otherwise, the truss channel fitting 1000 is similar to the mechanical fitting 500 described with reference to FIGS. 5A and 5B. Because the width of the sloping plates 1010 and 1014 or compressive members varies from a smaller width "W1" near the bolt 1016 to a larger width "W2" near the side walls 1022 and 1024, the thicknesses of the sloping plates 1010 and 1014 may also be varied from a thicker dimension near the bolt 1016 to a thinner dimension or thickness near each side wall 1022 and 1024. The width and thickness of the sloping plates 1010 and 1014 or compressive members may be varied such that the cross sectional area of the sloping plates 1010 and 1014 may be substantially constant.

The exemplary truss end pad fittings described herein may provide a stiffness or rigidity for connection of structures that approaches that of the parent material of the structures. This may be because the exemplary truss end pad fittings described herein provide a direct load path from the tension member (e.g. fastener or bolt) through the sloping plates or compression members into the area of the end plate or base structure that abuts an adjacent mirror or mating fitting to which an opposite end of the tension member attaches, similar to that illustrated in FIG. 6. Thus, there is no longer a need for a "toe" area that is typically required in prior art fittings, such as toe area 408 in FIG. 4. The opening 1028 illustrates removal of the toe area.

Figure 11:
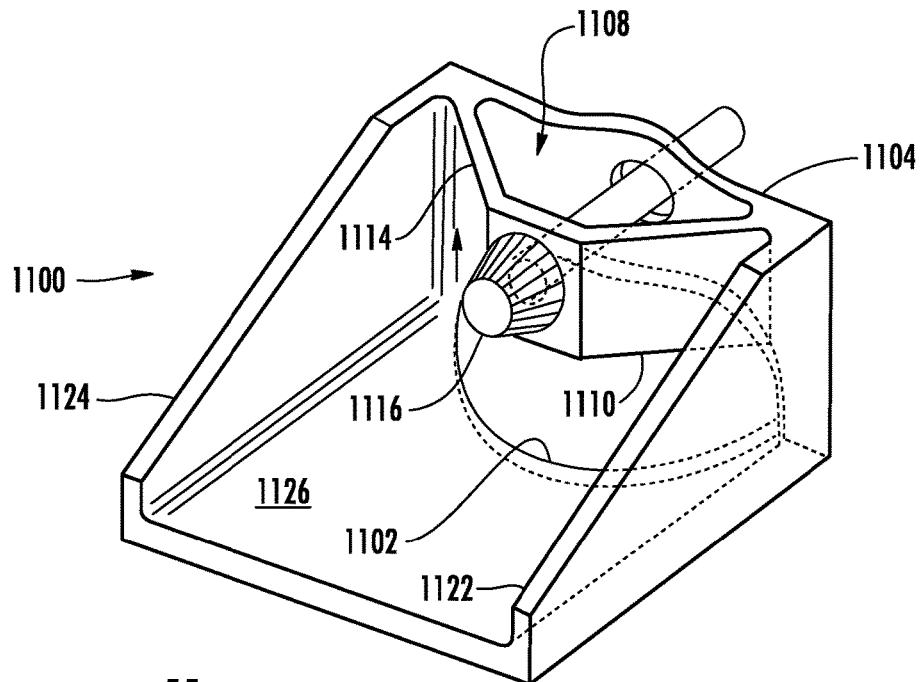
FIG. 11 is a perspective view of an example of a truss channel fitting without a toe area and including a truss end pad fitting in accordance with an embodiment of the present disclosure.

FIG. 11 is a perspective view of an example of a truss channel fitting 1100 without a toe area and including a truss end pad structure 1108 in accordance with an embodiment of the present disclosure. The opening 1102 illustrates the removed toe area. The force from the fastener or tension member 1116 is carried directly through the sloping plates 1110 and 1114 or compression members into the end plate or base member or structure 1104 and side walls 1122 and 1124. Longitudinal components of the forces are carried by the sidewalls 1122 and 1124 to the backplane 1126 through shear. The truss channel fitting 1100 may be effectively clamped with an adjacent mirrored fitting on another side at the intersection of the sloping plates 1110 and 1114 and the side walls 1122 and 1124 and is not clamped at the location of the bolt or fastener as in prior art end pad fittings without a truss structure as described herein.

As previously discussed, a limitation of prior art fittings is the size of the fillet radius between the backplane and the end plate or pad to preclude premature cracking at that fillet radius. The exemplary truss channel fitting 1100 in FIG. 11 avoids this deficiency by eliminating a joint between the base member or structure 1104 and the backplane 1126 by removing the toe area by forming the opening 1102. Because the load path no longer travels directly between the tension member 1116 and the backplane 1126, the intersection of those two elements has been removed. Furthermore, since the presence of material in that portion of the fitting would be low stress if it were present, and it is not necessary for stability of any of the other parts of the fitting, the material in the backplane near the front of the fitting can be removed to form the opening 1102, thus having the "scalloped" feature illustrated in the embodiments of FIGS. 10 and 11.

Figure 12:
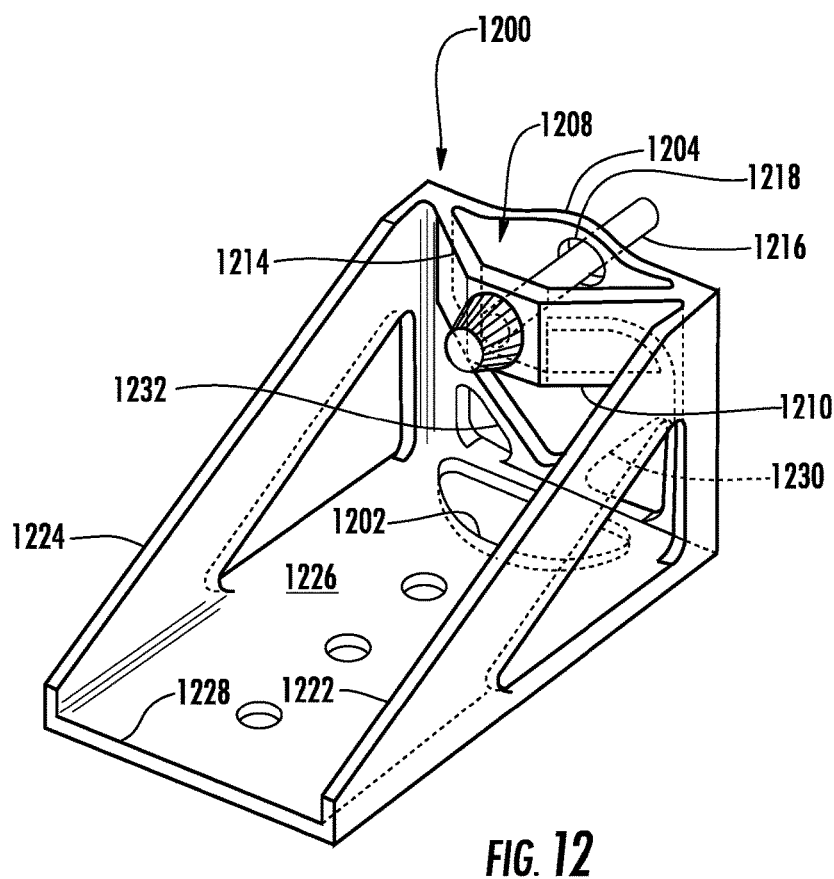
FIG. 12 is a perspective view of an example of a truss channel fitting including a truss end pad fitting in accordance with another embodiment of the present disclosure.

This concept can also be used to handle a larger eccentricity, for example, the exemplary truss channel fitting 1200 with a large eccentricity of the bolt 1216 in FIG. 12. FIG. 12 is a perspective view of an example of a truss channel fitting 1200 including an eccentric truss end pad structure 1208 in accordance with another embodiment of the present disclosure. In this embodiment, side members 1222 and 1224 that function like trusses replace the solid sidewalls 1122 and 1124 in FIG. 11. In this fitting, just as in the truss channel fitting 1100 illustrated in FIG. 11, the bolt 1216 tension load is carried by the compressive members 1210 and 1214 to the side members 1222 and 1224, but instead of transferring the load to the backplane 1226 by shear, the load is carried in axial tension through the side members 1222 and 1224. This axial tension is then sheared into the backplane 1226 near an end 1228 of the truss channel fitting 1200.

With the higher eccentricity of the truss support structure 1208, a horizontal member may be needed to prevent the truss channel fitting 1200 from opening up at the backplane 1226 near the scallop 1202. If the hole 1218 in the base member or structure 1204 is a close-fit hole, the possibility of transmitting lateral loads into the truss channel fitting 1200 is present. A loose fit hole 1218 is illustrated in FIG. 12 to avoid the possibility of transmitting the lateral loads into the truss channel fitting 1200. In this case, diagonal members 1230 and 1232 can be added as illustrated in FIG. 12 to efficiently transfer this lateral load.

Figure 13A:
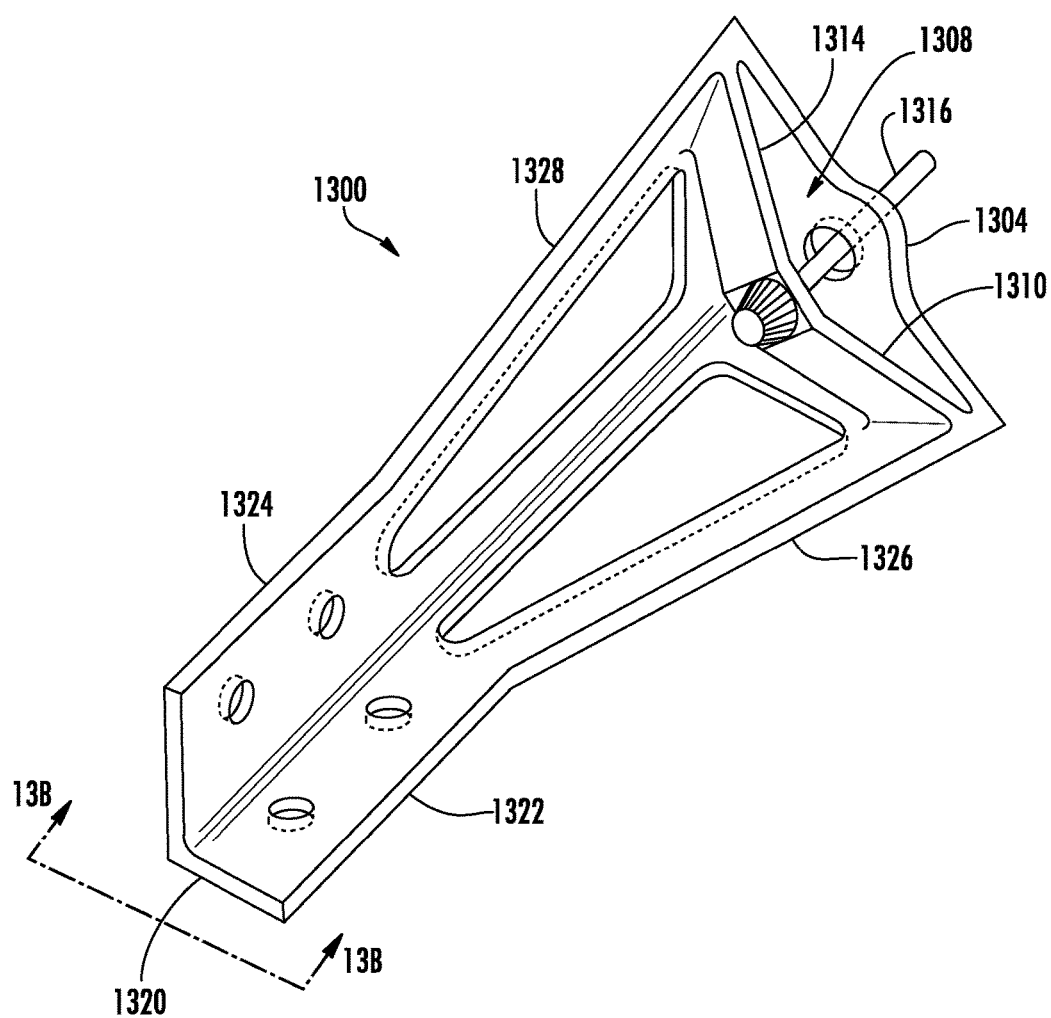
FIG. 13A is a perspective view of an example of a truss angle fitting including a truss end pad fitting in accordance with an embodiment of the present disclosure.
Figure 13B:
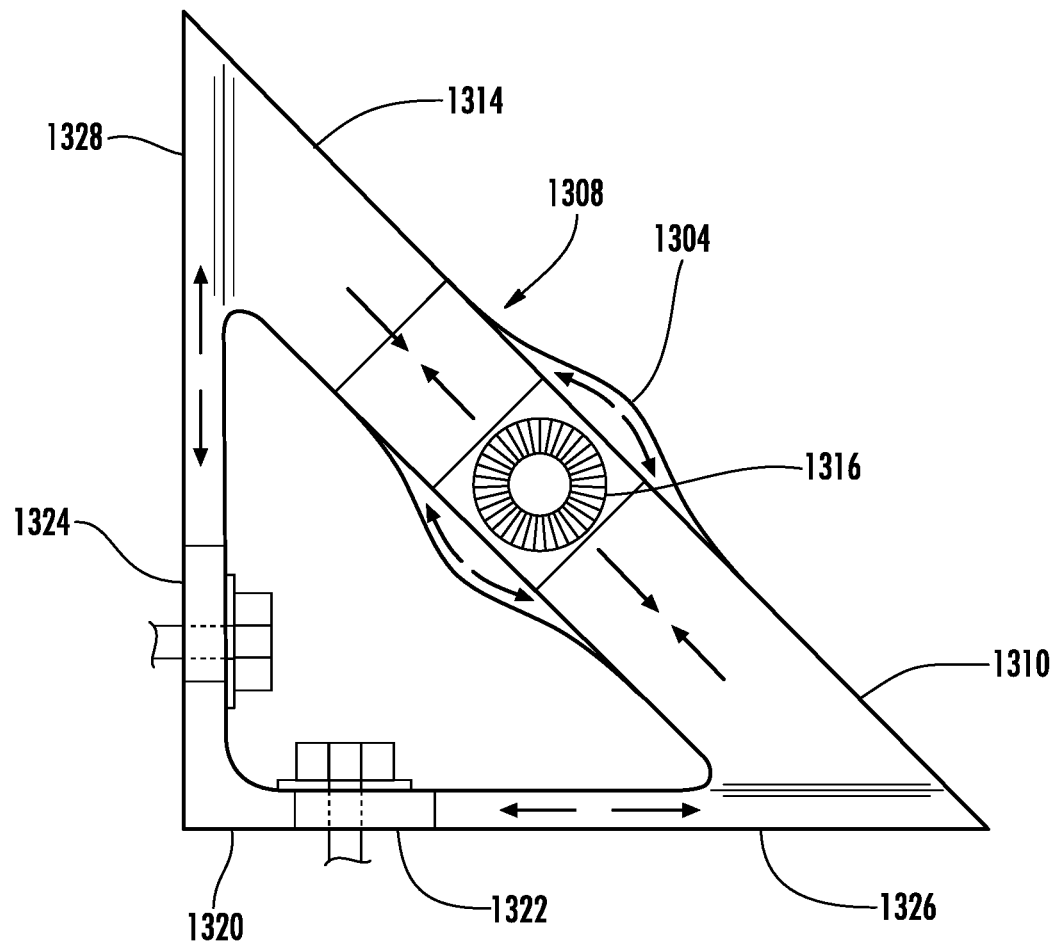
FIG. 13B is an end view of the exemplary truss angle fitting of FIG. 13A taken along lines 13B-13B, illustrating internal tension and compression stresses within the fitting.

FIG. 13A is a perspective view of an example of a truss angle fitting 1300 including a truss end pad structure 1308 in accordance with an embodiment of the present disclosure. FIG. 13B is an end view of the exemplary truss angle fitting 1300 of FIG. 13A taken along lines 13B-13B. FIG. 13B also shows the internal tension and compression stresses in the end plate 1304 and the sloping plates 1310 and 1314. Similar to the other mechanical fittings described herein, the tension in the bolt 1316 or other fastener is carried by the two sloping plates 1310 and 1314 or compression members into a base structure 1304 and side walls 1322 and 1324. In the truss angle fitting 1300 depicted in FIGS. 13A and 13B, the forces transmitted into the side walls 1322 and 1324 by the compression members 1310 and 1314 or sloping plates are thus carried to an end portion 1320 of the truss angle fitting 1300 by upper outer chords 1326 and 1328 of the side walls 1322 and 1324, respectively that meet or come together proximate the end portion 1320 of the truss angle fitting 1300.

FIG. 14 is top view of a pair of prior art angle clips 100 fastened together for connecting two structures 1400 and 1402. The angle clips 100 are similar to the angle clip 100 described with reference to FIG. 1. FIG. 15A is a top view of a pair of truss angle tension clips 1500 each including a truss end pad support structure 1502 for joining two structures 1504 and 1506 in accordance with an embodiment of the present disclosure. FIG. 15B is a top view of the pair of truss angle tension clips 1500 of FIG. 15A illustrating forces or loads on the truss angle tension clips 1500 and truss end pad support structure 1502, and the tension and compression stresses within the members of the fitting. Each of the truss angle tension clips 1500 may include a base member or base structure 1508 and a plate member 1510. A first sloping plate 1512 and a second sloping plate 1514 or compression members may extend between the plate member 1510 and the base structure 1508. The truss angle tension clips 1500 may be clamped together by a tension member 1516 or bolt. Each of the truss angle tension clips 1500 include a side wall 1518 extending from the base structure 1508. Each side wall 1518 may extend substantially perpendicular to the base structure 1508, although depending upon the application, the side wall 1518 may extend from the end plate 1508 at some other angle. The truss end pad support structure 1502 eliminates bending from the tension member 1516. Accordingly, the tension member 1516 can be made smaller than the tension member associated with the prior angle clip 100 in FIG. 14. Additionally, the thicknesses of the side walls 1518 can be reduced compared to the side walls 108 as illustrated by comparing FIGS. 15A and 15B to FIG. 4 because bending stresses are substantially minimized by the truss end pad support structure 1502 relative to the prior art angle clip 100 in FIG. 14.

As illustrated in FIGS. 15A and 15B, the sloping plate 1512 or compression member on one side of the truss end pad structure 1502 does not have a side wall or vertical leg adjacent to it. This is inconsequential, because the purpose of the truss fitting is to firmly clamp the two side walls 1518 together at the mating surfaces between the two fittings. The sloping plates 1512 and 1514 or compression members are present only because symmetry is required, so that the forces at the head of the tension member 1516 and along the mating surface of the base members or structures 1508 are balanced. There is force balance from the sloping plates 1512 and 1514 except for a net horizontal force. The net horizontal force is balanced by the pair of base structures 1508 in tension.

Figure 17B:
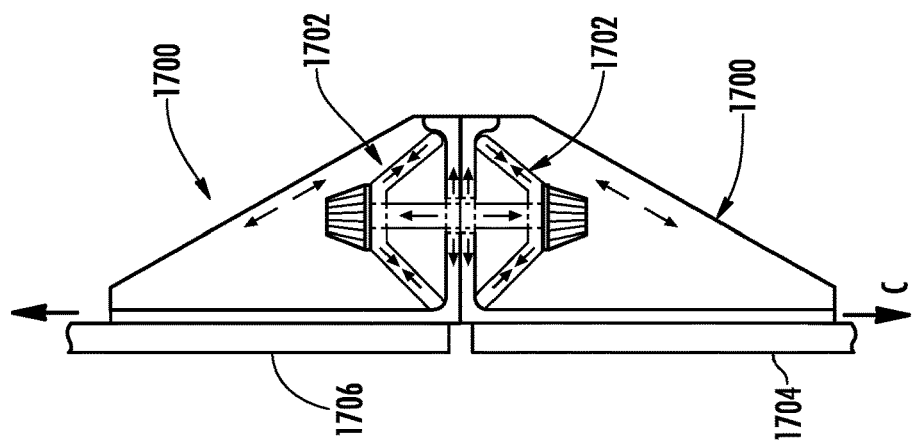
FIG. 17B is a top view of the pair of truss angle tension fitting of FIG. 17A illustrating forces or loads on the truss angle tension fitting and internal tension and compression stresses within the fitting.
Figure 17A:
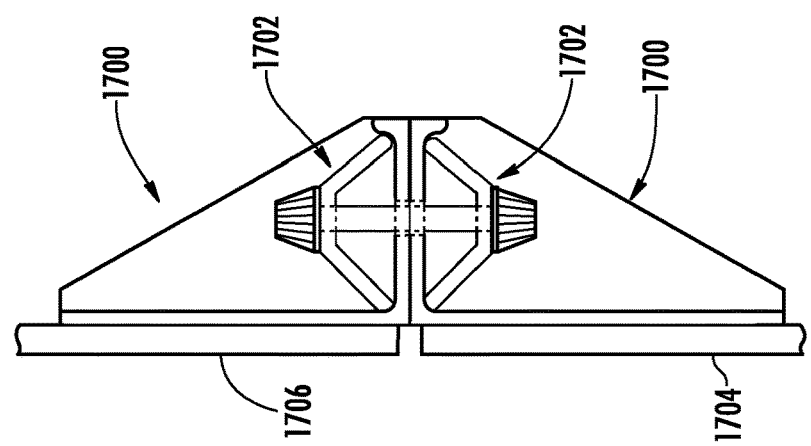
FIG. 17A is a top view of a pair of truss angle tension fittings including a truss end pad support structure for joining two structures in accordance with an embodiment of the present disclosure.
Figure 16:
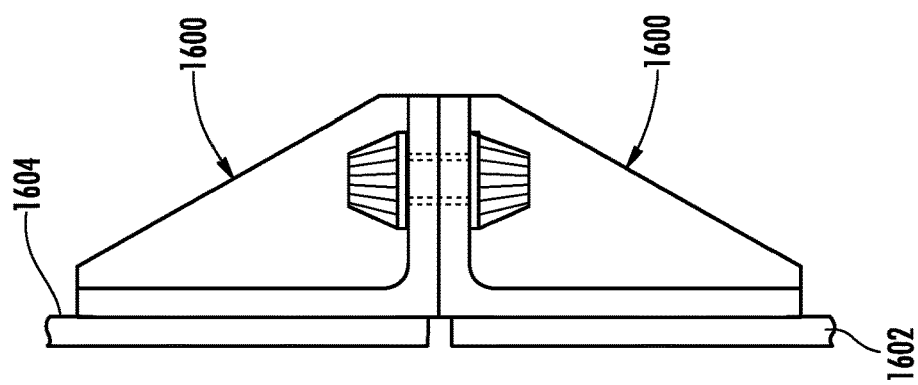
FIG. 16 is a top view of a pair of prior art angle tension fittings fastened together for connecting two structures.

The sloping plates 1512 and 1514 or compression member arrangement illustrated in FIGS. 15A and 15B may also be applied to angle fittings, channel fittings and other mechanical fittings. FIG. 16 is a top view of a pair of prior art angle tension fittings 1600 fastened together for connecting two structures 1602 and 1604. FIG. 17A is a top view of a pair of truss angle tension fittings 1700 each including a truss end pad support structure 1702 for joining two structures 1704 and 1706 in accordance with an embodiment of the present disclosure. FIG. 17B is a top view of the pair of truss angle tension fitting 1700 of FIG. 17A illustrating forces or loads on the tension clip and truss end pad structure 1702, and the internal tension and compression stresses. In the embodiment in FIGS. 17A and 17B, the truss end pad support structures 1702 are separate components from the truss angle tension fitting 1700 and are separately formed. The truss end pad support structure 1702 may be similar to the truss support structure 708 described with reference to FIG. 7, or it may be arranged in an integral manner as described with reference to FIG. 6. In other embodiments, the truss end pad support structure 1702 may be arranged as separate pieces as described with reference to FIG. 8. While the fittings 1500 and 1700 in FIGS. 15 and 16 are shown to mirror one another or to be substantially identical, they do not need to be and have different configurations or be different types of fittings.

One aspect of the truss angle tension fitting 1700 is that it can provide a smooth transfer of load from one fitting to its mating fitting along all of the boundaries which have backup structure. A significant benefit of the truss end pad arrangement is that it allows the mating surfaces to be clamped very close to the location of the mating surface, in contrast to the prior art fittings, which are clamped at a remote location (at the bolt or tension member). The prior art fittings show a tendency to "open up" at the end pad bends, thus decreasing the joint stiffness. The fittings described in the invention will maintain their joint stiffness at higher loads, until the tension member stretches so much that the fittings separate. Thus, in the case of angle clips, one edge is firmly clamped. In the case of channel tension clips, two opposite sides are clamped. In the case of angle clips, two adjacent sides are clamped. In the case of channel fittings, three sides are clamped. For angle tension clips, an additional edge is also clamped. This additional edge does not transfer axial loads from one fitting to the other fitting, but it provides for a nearly symmetrical system of forces for the bolt, compression members, and the other leg or side wall of the angle tension fitting.

For angle fittings and channel fittings, all four edges are clamped, even though not all of those edges transfer load from one fitting to the mating fitting. However, just as in the case of the angle tension clip, clamping the other edges provides for load balance at the bolt, compression members or sloping plates, and side walls.

The different embodiments of truss end pad fittings have been illustrated and described using a rectangular polygon, with a subset of the edges of the rectangular polygon being used to transfer the load from one fitting to the mating fitting. FIGS. 18A-18E are each a top view of different fittings 1800-1808 including a rectangular polygon truss end pad fitting in accordance with an embodiment of the present disclosure. The fitting in FIG. 18A is an angle tension clip 1800 with a side wall extending from only one side 1810 (illustrated by the cross-hatching) of the angle tension clip 1800. The fitting in FIG. 18B is a channel tension clip including side walls 1812 and 1814 (illustrated by cross-hatching) extending from two opposite sides of the truss end pad fitting 1802. The fitting in FIG. 18C is an angle fitting 1804 including side walls 1816 and 1818 extending from two adjacent sides of the angle fitting 1804. The fitting in FIG. 18D is a channel fitting 1806 including side walls 1820, 1822 and 1824 extending from three sides of the channel fitting 1806. The fitting in FIG. 18E is a full surround fitting 1808 including side walls 1826-1832 extending from all four sides of the full surround fitting 1808. The side walls are illustrated by cross-hatching in FIGS. 18A-18E.

Figure 18F:
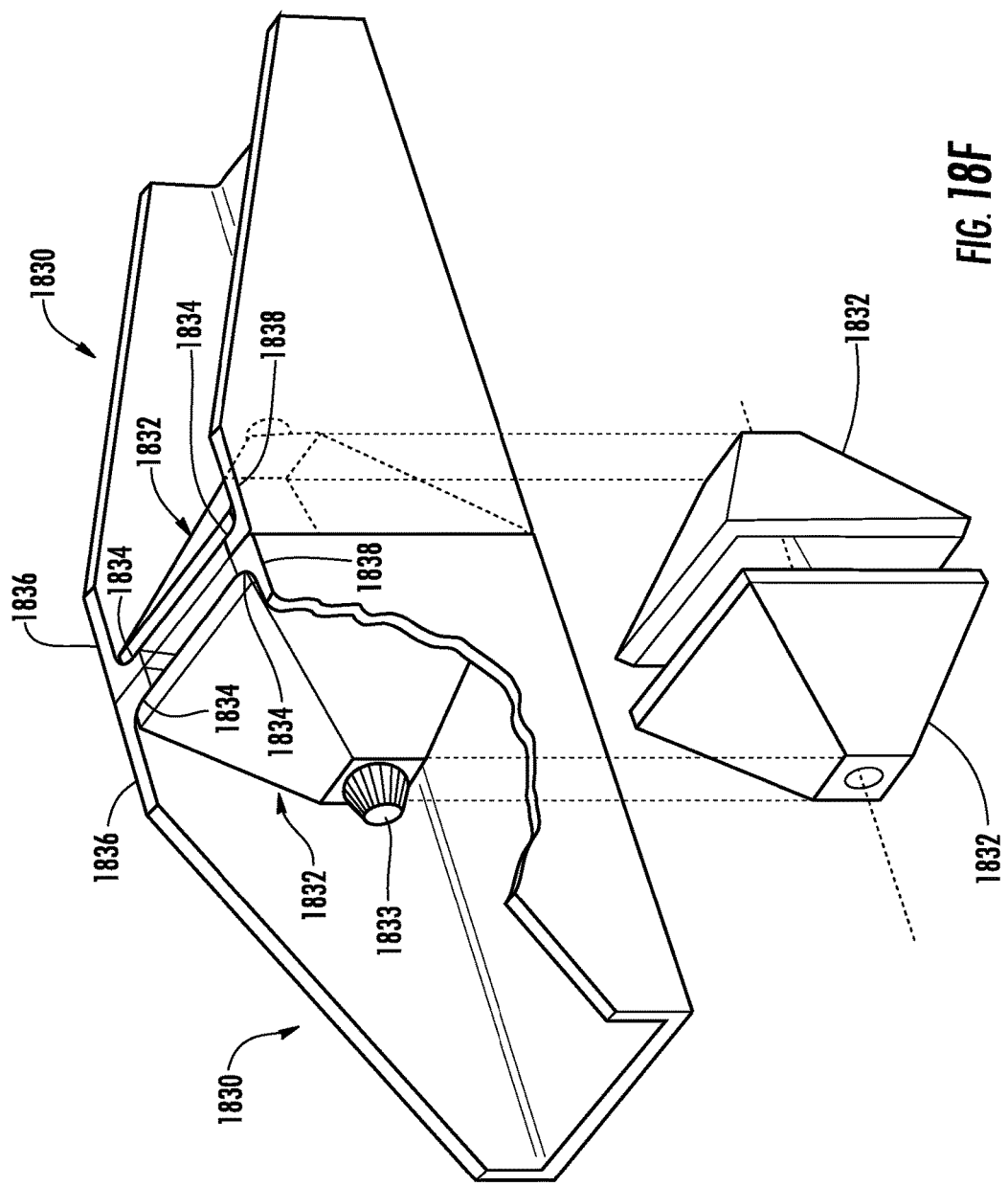
FIGS. 18F, 18G, 18H, 18I and 18J are each a trimetric view of different fittings in which the end plate is removed or altered in accordance with an embodiment of the present disclosure.

Referring now to FIG. 18F, a channel tension fitting 1830 is illustrated. This configuration differs from those discussed thus far in that it does not have an end plate included. The function of the end plate (to prevent the base of the pyramid shape 1832 from spreading apart) is performed by the lower portions of the sloping pyramid shape 1832 being stretched in tension in a direction parallel with the base of the pyramid 1832 and substantially perpendicular to the longitudinal axis of the fastener 1833. A base structure or base member 1834 of each fitting extending from the side walls 1836 and 1838 may only extend partially between the side walls 1836 and 1838. FIG. 8G shows only the pyramid 1832 with the tension forces and compression forces in the pyramid 1832 indicated. The compression forces in the pyramid sides are oriented similar to the compression forces in the sloping plates illustrated in FIGS. 5B, 15B, and 17B. The lower portion of the pyramid sides near the base experience tension in a circumferential direction around the base of the pyramid 1832.

Figure 18G:
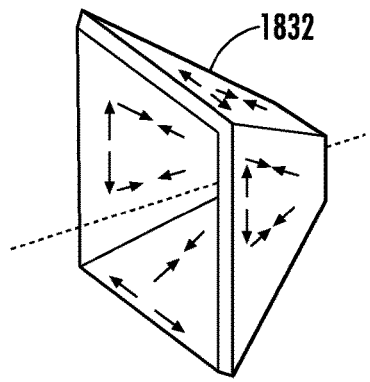
Figure 18H:
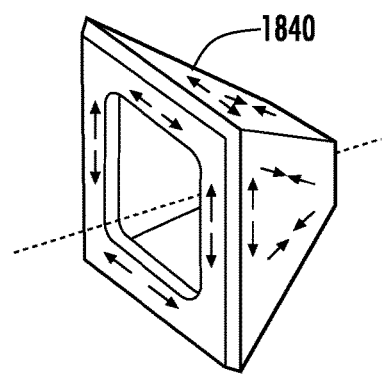

FIG. 18H is an example of another embodiment of a pyramid shape 1840. In FIG. 18H, material has been added to the base plane of the pyramid 1840, making this configuration or embodiment stiffer and more efficient compared to the configuration illustrated in FIG. 18G.

Figure 18I:
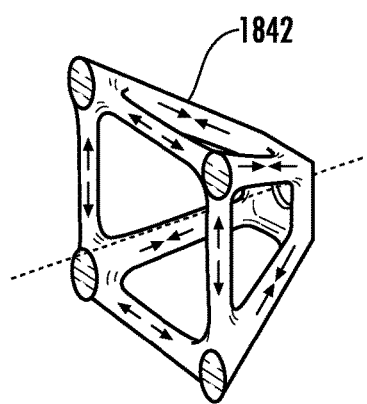

FIG. 18I is an example of another embodiment of a pyramid 1842. In FIG. 18I, the sloping plates of the pyramid 1832 have been replaced by elongate members substantially along the edges of the pyramid 1842. These elongate members carry compression forces. The perimeter of the base of the pyramid 1842 is also comprised of elongate members, which carry tension forces. Thus, the perimeter elongate members serve the same restraining function as the end plate of the fittings illustrated in FIGS. 5B, 15B, and 17b which include end plates.

Figure 18J:
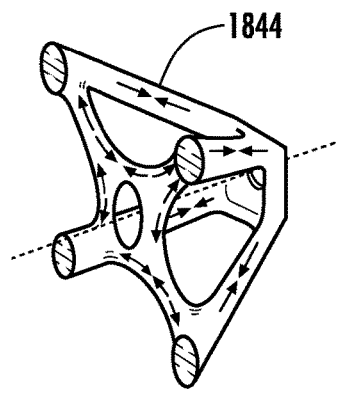

The configuration or embodiment of the pyramid 1844 shown in FIG. 18J is similar to that illustrated in FIG. 18I, except that the perimeter elongate members have been replaced by diagonal elongate members. The diagonal elongate members carry tension forces, and also serve the restraining function as the perimeter elongate members of the configuration shown in FIG. 18I. It will be appreciated by one skilled in the art that the material in the pyramids and base can be arranged in many ways, of which only a few are illustrated herein.

With reference to FIG. 18H it is noted that the material in the base plane 1846 of the fitting is in the plane of the base. In reference to FIG. 18J, it is noted that the elongate members are arranged such that they are some distance away from the plane of the base which mates to another structure or adjoining fitting, and are thus closer to the bolt head. This distance will cause small moments to be generated in the sloping elongate members. However, if it is advantageous to arrange the perimeter elongate members in this manner due to greater ease of manufacturing, these relatively small moments can be easily tolerated. This general principle applies to all fittings in this disclosure. Although the greatest benefit due to weight savings can be realized by arranging the sloping plates and/or elongate members such that they carry only axial tension or compression forces, small moments created by small departures from the ideal geometry can be tolerated if other such as easier manufacturing or ease of assembly provide a significant benefit.

Truss end pad fittings may also be formed in different shapes or may include end plates of different shapes, such as for example irregular polygons of three or more sides. A subset of these edges may transfer loads from one fitting to the mating fitting. There is no limitation as to the arrangement of sides which transfer or not transfer load. For best efficiency, compression members or sloping plates are located at those points or edges which have mating structure. FIGS. 19A-19E are each a top view of a different fitting 1900-1908 including an irregularly shaped truss end pad fitting in accordance with an embodiment of the present disclosure. Side walls extending from the irregular fittings 1900-1908 are illustrated by cross-hatching the side wall extending out of the page. FIGS. 19D and 19E illustrate that the side walls of the fitting need not be straight. Although straight side walls, sloping plates, and end plates are typically the most efficient, non-straight side walls, sloping plates, or end plates can be used.

Figure 20A:
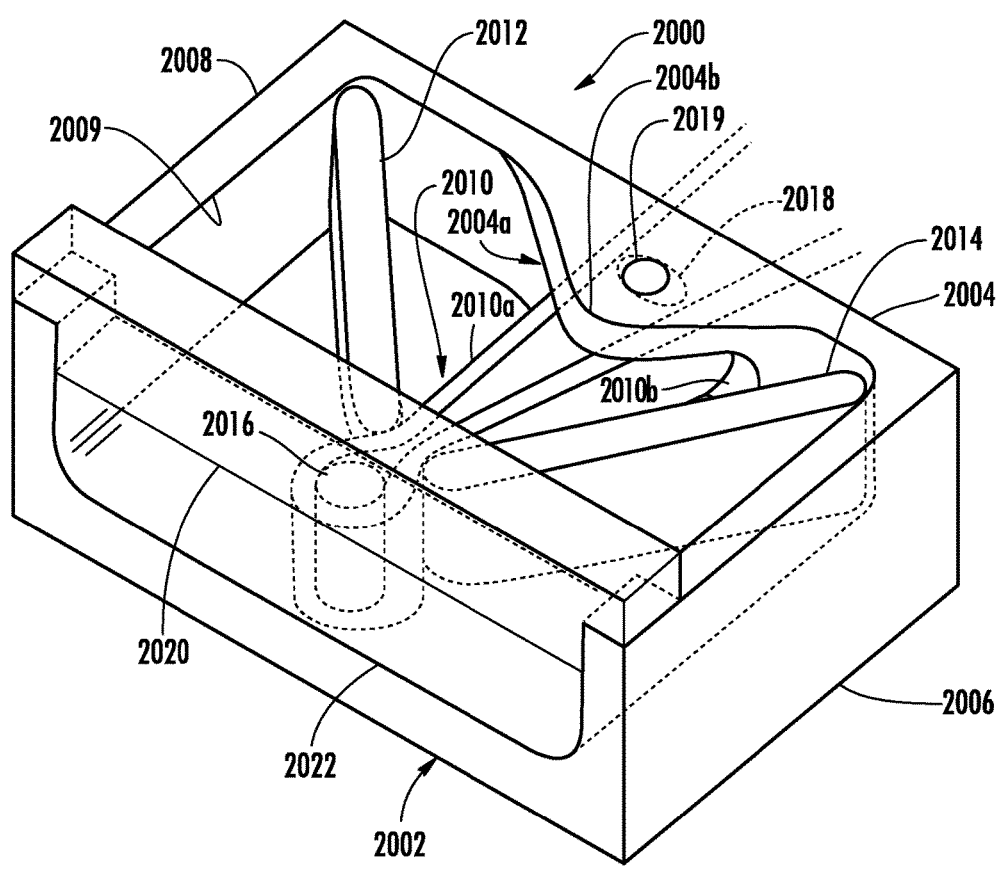
FIG. 20A is a perspective view of a portion of another truss channel fitting in accordance with an embodiment of the present disclosure.
Figure 20B:
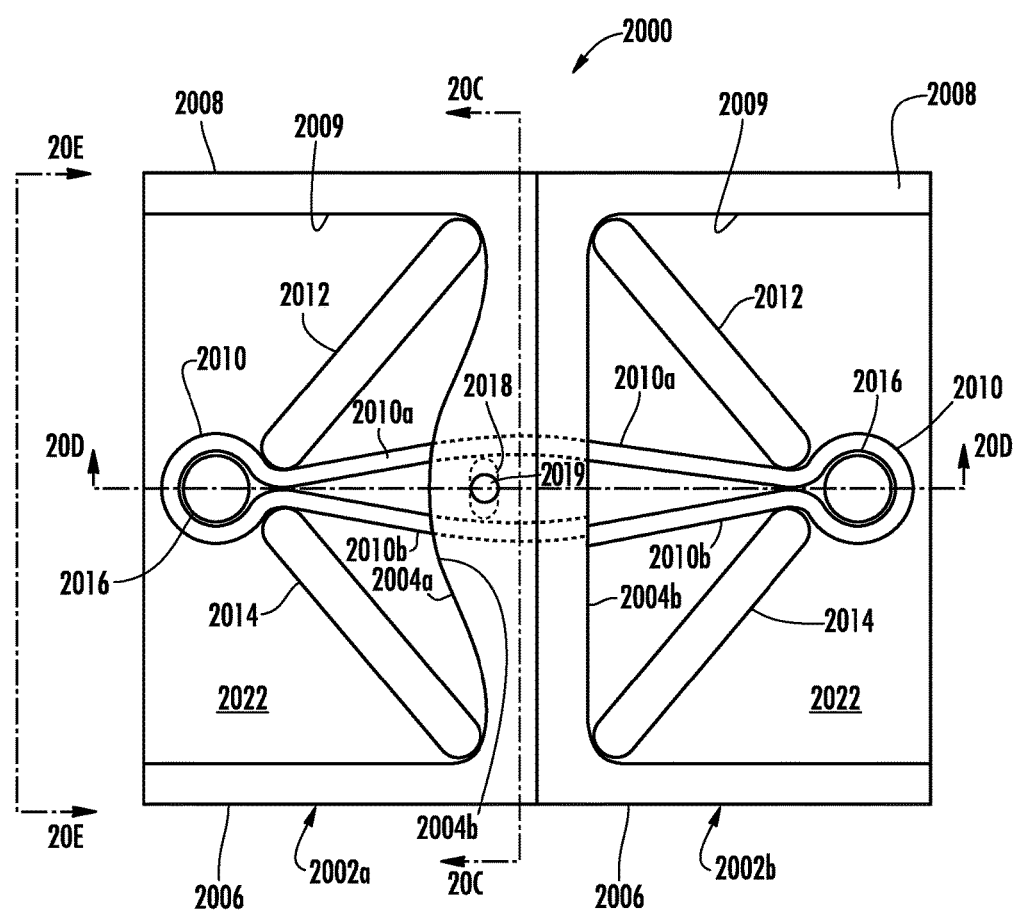
FIG. 20B is a plan view of the exemplary truss channel fitting of FIG. 20A, showing two mating fittings.
Figure 20C:
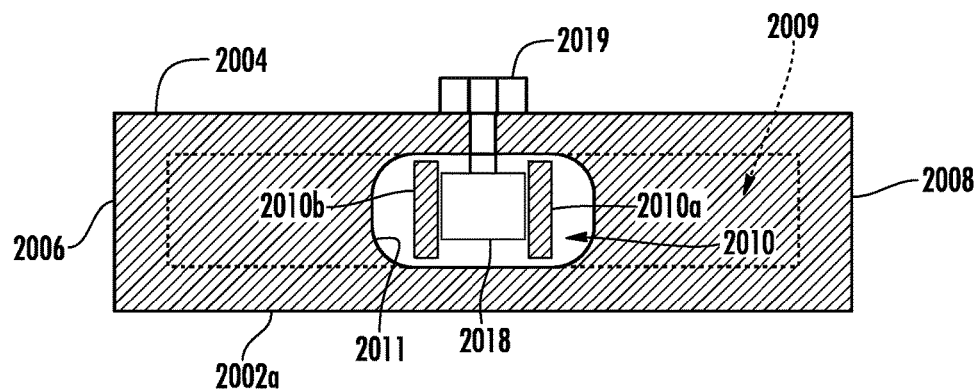
FIG. 20C is a cross-section view of the exemplary truss channel fitting of FIG. 20B taken along lines 20C-20C.
Figure 20D:
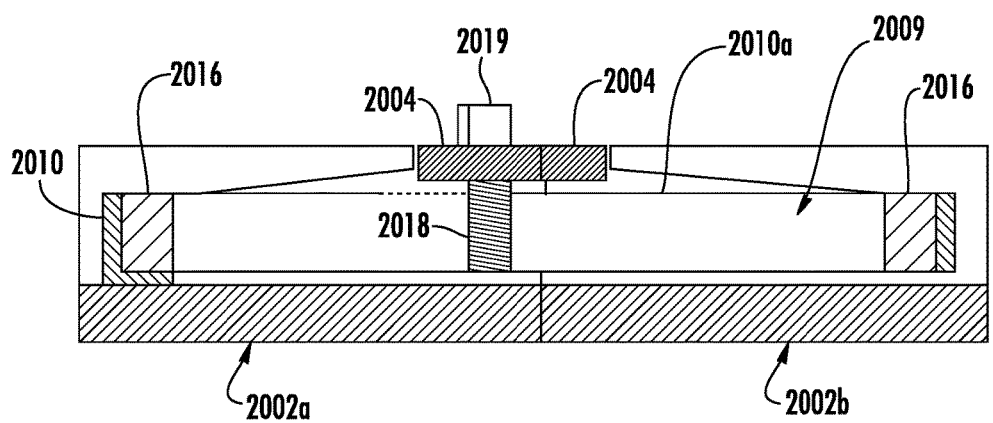
FIG. 20D is a cross-sectional view of the exemplary truss channel fitting of FIG. 20B taken along lines 20D-20D.
Figure 20E:
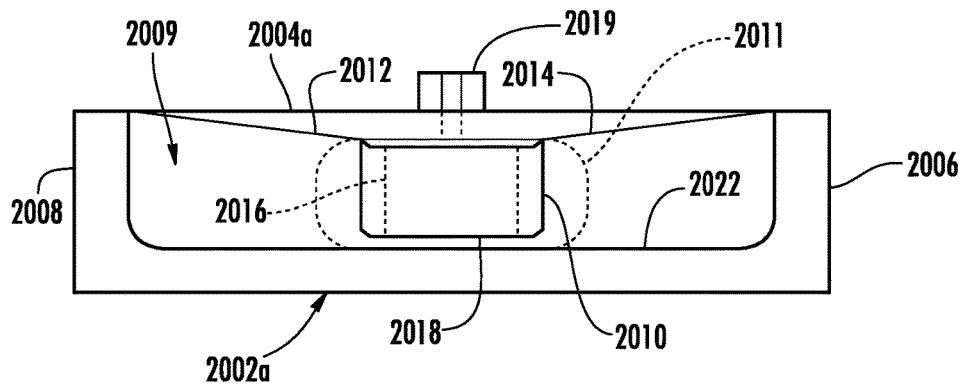
FIG. 20E is an end view of the exemplary truss channel fitting of FIG. 20B taken along lines 20E-20E.

FIG. 20A is a perspective view of a portion of an example of a truss end pad fitting 2000 in accordance with an embodiment of the present disclosure. FIG. 20B is a plan view of the exemplary truss end pad fitting 2000 of FIG. 20A. FIG. 20C is a cross-section view of the exemplary truss end pad fitting 2000 of FIG. 20B taken along lines 20C-20C. FIG. 20D is a cross-sectional view of the exemplary truss end pad fitting 2000 of FIG. 20B taken along lines 20D-20D. FIG. 20E is an end view of the exemplary truss end pad fitting of FIG. 20B taken along lines 20E-20E.

Each truss end pad fitting 2000 includes a support fitting 2002. The support fitting 2002 may include an integrally formed end plate, base structure or membrane 2004 and side walls 2006 and 2008. The membrane 2004 and side walls 2006 and 2008 may form a cavity 2209 in the support fitting 2002. The truss end pad fitting 2000 may also include a tension member or band 2010. The band 2010 carries the tension loads and replaces the fastener or bolt in conventional truss end pad fittings. As best illustrated in FIG. 20C, the base structure or membrane 2004 of support fitting 2002 includes an opening therein 2011 through which the band 2010 may extend between the mating support fittings 2002a and 2002b as best illustrated in FIG. 20B. The base structure or membrane 2004a of one support fitting 2002a may be different than the base structure or membrane 2004b of the mating support fitting 2002b as illustrated in FIG. 20B. The base structure or membrane 2004a may bow into the cavity 2009 of the support fitting 2002a. Or, the base structure or membrane 2004a may have a flange 2004b that extends into the cavity 2009 of the support fitting 2002a. In other embodiments, the end plates may be the same.

The truss end pad end pad fitting 2000 may also include a pair of compression members, sloping plates or elbows 2012 and 2014 to carry compressive loads. The elbows 2012 and 2014 may be the same or similar to the sloping plates previously described.

A noodle 2016 or other retention mechanism prevents the band 2010 from sliding past the elbows 2012 and 2014. The noodle 2016 may be any shape that permits an end of each of the elbows 2012 and 2014 to be retained as illustrated in FIGS. 20A and 20B. The band 2010 is a bifurcated band including a first band segment 2010a and a second band segment 2010b. The band 2010 extends around the noodle 2016 and may define a second plate or performs the function of the second plate in the previous embodiments. The noodle 2016 also replaces a bolt head or fastener head while also retaining the elbows 2012 and 2014, compression members or sloping plates. Accordingly, an end of the first elbow 2012 or sloping plate may abut a vertex or stop formed by the band 2010 extending around the noodle 2016 or second plate. An opposite end of the first elbow 2012 may abut a vertex formed by the membrane 2004 and side wall 2008 of the support fitting 2002. Similarly, the second elbow 2014 or sloping plate may abut a vertex or stop formed by the band 2010 extending around the noodle 2016 and an opposite end of the first elbow 2012 may abut a vertex formed by the membrane 2004 and the other side wall 2006 of the support fitting 2002. Each of the first elbows 2012 and second elbow 2014 may extend from the membrane 2004 at a predetermined angle relative to a plane of the membrane 2004.

The elbows 2012 and 2014 may be specially formed so that the ends of the elbows nest against the band segments 2010a and 2010b and the end plate or membrane 2004 of the support fitting 2002 such that bearing stresses may be reduced. The ends of the elbows 2012 and 2014 may be treated or coated with a material such that there is an advantageous interface between the two materials of the elbows and the support fitting 2002. For example, a coating may be selected to protect the components from galvanic corrosion, to either increase or decrease the coefficient of friction between the components, for example coated in a lubricant, or a coating for some other desired purpose or performance characteristic. This feature may also be applied to the fittings described with reference to FIGS. 7 and 8. Strain gauge elements may also be installed or embedded in the elbows 2012 and 2014 to measure load in the fitting 2000.

The truss end pad fitting 2000 may also include a cam 2018 or similar feature to spread the two segments of the band 2010 apart, thus inducing additional tension in the band segments 2010a and 2010b. The band 2010 replaces the bolt or other fastener in a conventional fitting. The cam 2018 may include a knob 2019 for operating the cam 2018 to induce tension in the band 2010 as best illustrated in FIG. 20C. The band 2010 may be made from a metallic material or any other material that has a high tensile strength. The band 2010 need not be extremely stiff but may need to be stiff enough so that the cam 2018 is effective in tightening the band segments 2010a and 2010b. The cam 2018 may be substantially elliptically shaped such that the cam 2018 is oriented with a smaller dimension perpendicular to the axis of the band 2010 during assembly. After all components of the fitting 2000 are in place, the cam 2018 may be rotated such that the long dimension of the cam 2018 is perpendicular to the axis of the band segments 2010a and 2010b, thus spreading the segments apart to provide tension in the band 2010 and to retain the elbows 2012 and 2014 in place. The tension provided by rotating the cam 2018 results in a tensile strain being applied to the band segments 2010a and 2010b sufficient to apply the desired amount of preload in the fitting 2000.

If the band 2010 is made from a solid metallic material, the band 2010 may yield upon the spreading action of the cam 2018. Thus the band 2010 may be a throw-away or disposable component similar to a cotter pin if the fitting 2000 is taken apart for maintenance. Further, the band 2010 may be formed by a plurality of wires which may be wrapped around the noodle 2016 like a cable. The plurality of wires may be quite stiff and strong in tension but quite flexible in bending. Accordingly, the spreading action by the cam 2018 will not result in large bending stresses in the plurality of wires near the noodle 2016 and near the cam 2018. The allowable stresses of small wires are typically greater than they are for solid materials. Thus, a small cross-sectional area may be employed. The plurality of wires may also provide resistance to the consequences of fatigue. If one wire should crack the defect will not spread to the adjacent wires as may be the case for a solid malleable metal band.

The band 2010 may also be made from fibers, such as carbon fibers, Kevlar or similar fiber materials which have very high strengths and stiffness. Kevlar is a trademark of E.I. Dupont de Nemours and Company in the United States, other countries or both. Using such fiber materials may result in even smaller cross-sectional areas which in turn reduces eccentricities similar to those previously described. If a non-metallic (non-conducting) material is used for the band 2010, a single metallic wire (or small set of metallic wires) could function as a strain gauge for measuring the load in the band 2010, and thus, the load in the fitting 2000.

The cam 2018 may include a detent or other mechanism to permit locking the cam 2018 in position with the band 2010 in tension to prevent the cam 2018 from rotating out of its preferred alignment due to vibration or other environmental effects.

A cover or retention bar 2020 may be provided to prevent the noodle 2016 and elbows 2012 and 2014 from moving vertically away from a lower wall 2022 of the support fitting 2002 and out of the cavity 2009 of the fitting 2000.

Because the band 2010, elbows 2012 and 2014, and other components are separate, they can each be made from different materials having different material characteristics or properties, such as electrical conductive or insulative properties, thermally conductive or insulative properties or other material properties depending on the design and application of the fitting 2000. The components may also include features to provide a degree of vibration isolation if desired or needed. If the fitting 2000 is a more lightly loaded fitting, certain components of the fitting may be replaced with a compliant material that provides some degree of isolation from vibration. These features can also apply to the other fittings described herein.

Figure 21:
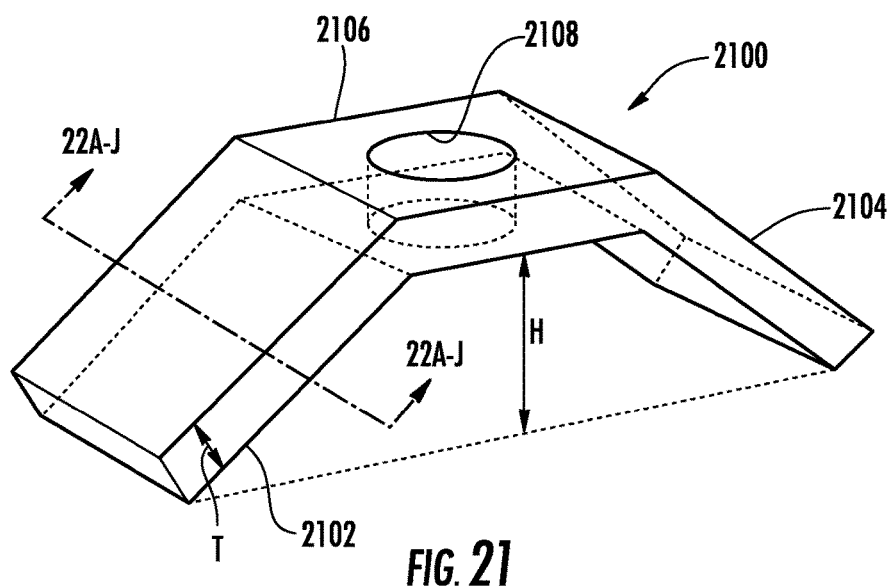
FIG. 21 is an example of a sloping plate for use in a truss end pad fitting in accordance with an embodiment of the present disclosure.
Figure 22A:
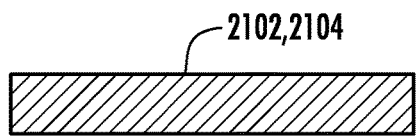
FIGS. 22A-22J are each an example of a different cross-section of the sloping plate taken along lines 22A-22J of FIG. 21, each in accordance with a different embodiment of the present disclosure.
Figure 22B:
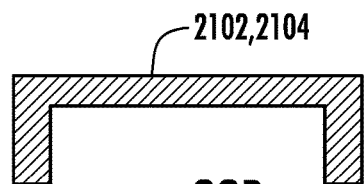
Figure 22C:
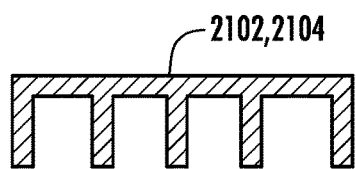
Figure 22D:
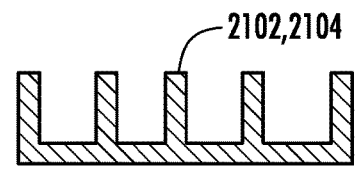
Figure 22E:
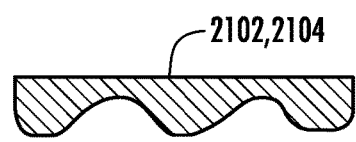
Figure 22F:
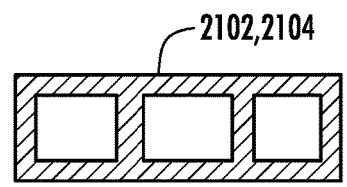
Figure 22G:
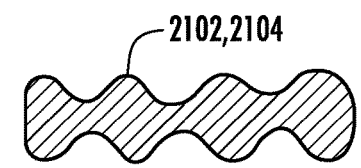
Figure 22H:
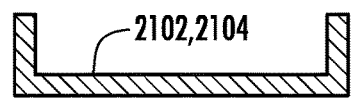
Figure 22I:
Figure 22J:
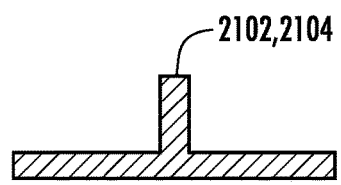

FIG. 21 is an example of a truss support structure 2100 for use in mechanical fittings similar to those described herein in accordance with an embodiment of the present disclosure. The truss support structure 2100 may also be referred to as a compression member. The truss support structure 2100 or compression member may be substantially pyramid shaped as illustrated in FIG. 21. Similar to that previously described truss support structure 2100 may include two sloping plates 2102 and 2104 or pyramid sides joined by an upper or top plate 2106. The top plate 2106 may be adapted for receiving a fastener (not shown in FIG. 21). The top plate 2106 may have an opening 2108 formed therein for receiving a tension member or fastener, such as a bolt or other fastener similar to those described herein. The tension member or fastener may include a head or fitting to abut or contact a periphery or boundary of the opening 2108 so that the fastener is held or retained by the truss support structure 2100 for applying tension to the fastener and compression in the sloping plates 2102 and 2104 of the truss support structure 2100 or compression member similar to that illustrated and described herein when tension is applied to the fastener.

The truss support structure 2100 in FIG. 21, and as illustrated in other truss end plate fitting embodiments described above, is shown as including substantially flat sloping plates 2102 and 2104. For more heavily-loaded fittings, the thickness T of the truss support structure 2100 may need to be large enough compared to a slant height H of the sloping plates 2102 and 2104 that structural instability caused by buckling or deformation may not be a concern. However, for more lightly-loaded fittings, the thickness of the sloping plates 2102 and 2104 may be small enough such that if the form of the sloping plates may buckle. In this case, the cross-section of the sloping plates 2102 and 2104 need not be approximately constant, but may vary in thickness, or have stiffening elements or may be formed in different shapes. FIGS. 22A-22J are each an example of a different cross-section of the sloping plates 2102 and 2104 taken along lines 22A-22J in FIG. 21. Depending on the application and loading, the sloping plates 2102 and 2104 may each have a different one of the exemplary cross-sections shown in FIGS. 22A-22J.

Figure 23:
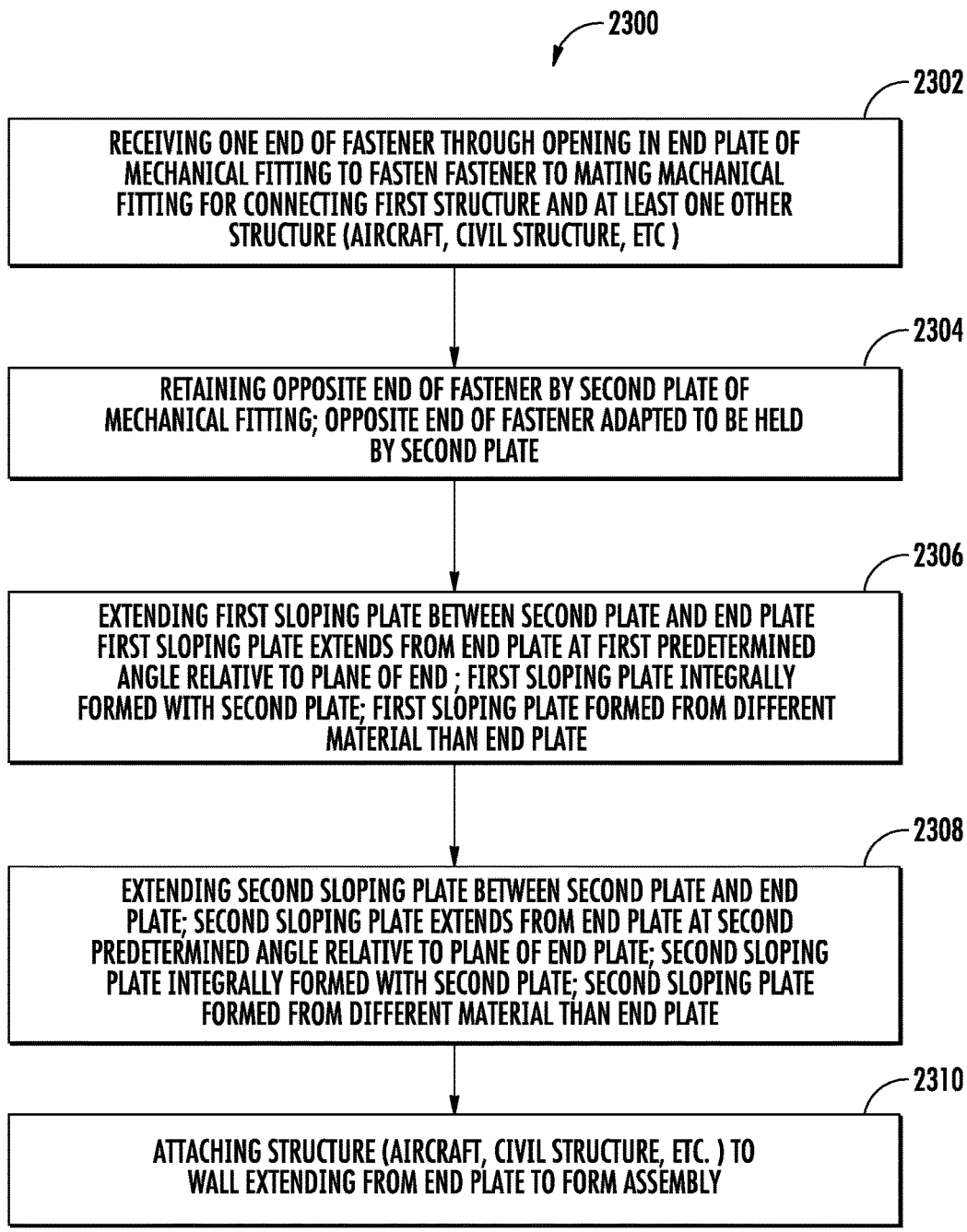
FIG. 23 is a flow chart of an example of a method for connecting a first structure to at least one other structure in accordance with an embodiment of the present disclosure.

FIG. 23 is a flow chart of an example of a method 2300 for connecting a first structure to at least one other structure in accordance with an embodiment of the present disclosure. The first structure and the at least one other structure may be a structure of an aircraft, civil structure or other assembly or subassembly. In block 2302, an end of a fastener may be received through an opening in an end plate of a mechanical fitting to fasten the fastener to a mating mechanical fitting for connecting the first structure to at least one other structure.

In block 2304, an opposite end of the fastener is retained by a second plate or upper plate of the mechanical fitting. The opposite end of the fastener is adapted to be held or retained by the second or top plate.

In block 2306, a first sloping plate or pyramid side of a compression member may extend between the second or upper plate and the end plate. The first sloping plate or pyramid side of the compression member may extend from the end plate at a first predetermined angle relative to a plane of the end plate. The first sloping plate or pyramid side may be integrally formed with the second or upper plate or may be a separate component of a truss support structure or compression member. The first sloping plate or pyramid side may be formed from a different material than the end plate to provide desired performance characteristics or selected properties such as superior performance under compression loads, lighter weight, etc.

In block 2308, a second plate or pyramid side of a compression member may be extended between the second or upper plate and the end plate. The second sloping plate or pyramid side may extend from the end plate at a second predetermined angle relative to the plane of the end plate. The second sloping plate or pyramid side may be integrally formed with the second plate or may be a separate component of the support structure or compression member. The second plate or pyramid side may also be formed from a different material from the end plate to provide desired performance characteristics or selected properties such as superior performance under compression loads, lighter weight, etc.

In block 2310, a structure, such as an aircraft structure, civil structure or other structure may be attached to a side wall extending from the end plate of the mechanical fitting to form an assembly.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A mechanical fitting for connecting structures, comprising:
   a first support fitting, the first support fitting comprising:
      a lower wall;
      a first side wall extending from the lower wall;
      a second side wall extending from the lower wall opposite the first side wall; and
      an end plate extending from the lower wall and extending between the first side wall and the second side wall;
   a first noodle extending from the lower wall;
   a band extending from the first noodle;
   a first sloping plate comprising a first end abutting the band and an opposite end abutting a vertex formed by the first side wall and the end plate, wherein the first sloping plate extends from the end plate at a first predetermined angle relative to a plane of the end plate; and
   a second sloping plate comprising a first end abutting the band and an opposite end abutting a vertex formed by the end plate and the second side wall, wherein the second sloping plate extends from the end plate at a second predetermined angle relative to the plane of the end plate.

2. The mechanical fitting of claim 1, further comprising a mechanism to create tension in the band.

3. The mechanical fitting of claim 1, wherein the band comprises a bifurcated band wrapped around the first noodle, the bifurcated band comprising a first band segment and a second band segment extending from the first noodle.

4. The mechanical fitting of claim 3, further comprising a cam disposed between the first band segment and the second band segment to create tension in the band.

5. The mechanical fitting of claim 4, wherein the cam comprise a détente that locks the cam in a position with tension in the band.

6. The mechanical fitting of claim 4, further comprising a knob for operating the cam to induce tension in the band.

7. The mechanical fitting of claim 4, wherein the band comprises a metallic material including a tensile strength that allows the first band segment and the second band segment to spread apart in response to action by the cam.

8. The mechanical fitting of claim 1, wherein the band comprises a plurality of wires.

9. The mechanical fitting of claim 1, wherein the band comprises a fiber material.

10. The mechanical fitting of claim 1, further comprising a strain gauge element associated with each of the first sloping plate and the second sloping plate to measure a mechanical load on the mechanical fitting.

11. The mechanical fitting of claim 1, further comprising a cover over the noodle, the first end of the first sloping plate and the first end of the second sloping plate to retain the sloping plates within a cavity formed by the lower wall, the first side wall, the second side wall and the end plate.

12. The mechanical fitting of claim 1, further comprising:
   a second support fitting, the second support fitting comprising:
      a lower wall;
      a first side wall extending from the lower wall;
      a second side wall extending from the lower wall opposite the first side wall; and
      an end plate extending from the lower wall and extending between the first side wall and the second side wall, wherein the end plate of the second support fitting abuts the end plate of the first support fitting;
   a second noodle extending from the lower wall of the second support fitting, wherein the band extends between the first noodle and the second noodle;
   a third sloping plate comprising a first end abutting the band and an opposite end abutting a vertex formed by the first side wall and the end plate of the second support fitting, wherein the first sloping plate extends from the end plate at a first predetermined angle relative to a plane of the end plate of the second support fitting; and
   a fourth sloping plate comprising a first end abutting the band and an opposite end abutting a vertex formed by the end plate and the second side wall of the second support fitting, wherein the second sloping plate extends from the end plate at a second predetermined angle relative to the plane of the end plate of the second support fitting.

13. The mechanical fitting of claim 12, wherein the band comprises a bifurcated band wrapped around the first noodle and the second noodle, the bifurcated band comprising a first band segment and a second band segment extending between the first noodle and the second noodle.

14. The mechanical fitting of claim 13, further comprising a cam disposed between the first band segment and the second band segment to create tension in the band.

15. The mechanical fitting of claim 12, wherein the end plate of the first support fitting comprises a flange to which the cam is rotatably mounted.

16. A mechanical fitting for connecting structures, comprising:
   a support fitting, the support fitting comprising:
      a lower wall;
      a first side wall extending from the lower wall;
      a second side wall extending from the lower wall opposite the first side wall;
      an end plate extending from the lower wall between the first side wall and the second side wall; and
      a cavity formed by the lower wall, the first side wall, the second side wall and the end plate;
   a noodle extending from the lower wall;
   a bifurcated band extending around the noodle, the bifurcated noodle comprising a first band segment and a second band segment;
   a first sloping plate comprising a first end abutting the band around the noodle and an opposite end abutting a vertex formed by the first side wall and the end plate, wherein the first sloping plate extends from the end plate at a first predetermined angle relative to a plane of the end plate;
   a second sloping plate comprising a first end abutting the band around the noodle and an opposite end abutting a vertex formed by the end plate and the second side wall, wherein the second sloping plate extends from the end plate at a second predetermined angle relative to the plane of the end plate; and
   a mechanism disposed between the first band segment and the second band segment to create tension in the band.

17. The mechanical fitting of claim 16, wherein the mechanism comprises a cam to create tension in the band.

18. The mechanical fitting of claim 17, wherein the end plate of the support fitting comprises a flange extending into the cavity to which the cam is rotatably mounted.

19. The mechanical fitting of claim 16, further comprising a cover over the noodle, the first end of the first sloping plate and the first end of the second sloping plate to retain the sloping plates within the cavity formed by the lower wall, the first side wall, the second side wall and the end plate.

20. A mechanical fitting for connecting structures, comprising:
   a first support fitting, the first support fitting comprising:
      a lower wall;
      a first side wall extending from the lower wall;
      a second side wall extending from the lower wall opposite the first side wall; and
      an end plate extending from the lower wall and extending between the first side wall and the second side wall;
   a first noodle extending from the lower wall;
   a band extending from the first noodle;
   a first sloping plate comprising a first end abutting the band and an opposite end abutting a vertex formed by the first side wall and the end plate; and
   a second sloping plate comprising a first end abutting the band and an opposite end abutting a vertex formed by the end plate and the second side wall;
   a second support fitting, the second support fitting comprising:
      a lower wall;
      a first side wall extending from the lower wall;
      a second side wall extending from the lower wall opposite the first side wall; and
      an end plate extending from the lower wall and extending between the first side wall and the second side wall, wherein the end plate of the second support fitting abuts the end plate of the first support fitting;
   a second noodle extending from the lower wall of the second support fitting, wherein the band extends between the first noodle and the second noodle;
   a third sloping plate comprising a first end abutting the band and an opposite end abutting a vertex formed by the first side wall and the end plate of the second support fitting; and
   a fourth sloping plate comprising a first end abutting the band and an opposite end abutting a vertex formed by the end plate and the second side wall of the second support fitting.

* * * * *